United States Patent
Huemoeller et al.

[19]

[11] Patent Number: 5,855,006
[45] Date of Patent: Dec. 29, 1998

[54] PERSONAL ACTIVITY SCHEDULING APPARATUS

[75] Inventors: Mark Alan Huemoeller, Arvada; John Walter Huemoeller, II, Golden, both of Colo.

[73] Assignee: Humware, Golden, Colo.

[21] Appl. No.: 609,847

[22] Filed: Mar. 1, 1996

[51] Int. Cl.⁶ .......................... G04B 19/24; G06F 15/21
[52] U.S. Cl. ................................................................. 705/9
[58] Field of Search ........................... 705/9, 5, 14, 26, 705/27

[56] References Cited

U.S. PATENT DOCUMENTS

| | | | |
|---|---|---|---|
| 5,129,057 | 7/1992 | Strope et al. | 395/161 |
| 5,237,499 | 8/1993 | Garback | 364/407 |
| 5,253,165 | 10/1993 | Leiseca et al. | 364/407 |
| 5,408,417 | 4/1995 | Wilder | 364/479 |
| 5,491,626 | 2/1996 | Williams et al. | 364/401 |
| 5,528,745 | 6/1996 | King et al. | 395/161 |
| 5,570,109 | 10/1996 | Jenson | 345/146 |

*Primary Examiner*—Kevin J. Teska
*Assistant Examiner*—Hani M. Kazimi
*Attorney, Agent, or Firm*—Duft, Graziano & Forest, P.C.

[57] ABSTRACT

The personal activity scheduling system accesses data from various sources to provide the user with information that is required to enable the user to conveniently and expeditiously schedule activities without requiring access to other sources of information. The personal activity scheduling system can include schedules of various sports activities, cultural events, birthdays and anniversaries, professional meetings and deadlines, and any other temporally based items of interest to the particular individual. Each of these temporally based activities can be associated with data representative of information required by the user to schedule an activity from the list of potential activities into the individual's personal calendar as well as make reservations and ticket purchases using this system.

40 Claims, 14 Drawing Sheets

5,855,006

PERSONAL ACTIVITY SCHEDULING APPARATUS

FIELD OF THE INVENTION

This invention relates to scheduling systems and, in particular, to apparatus for use by an individual in scheduling their temporally based activities and conducting transactions relating to these activities using a single system.

PROBLEM

It is a problem in the field of scheduling systems to provide a calendar based system which is both simple to use and provides adequate functionality to justify the user investing in and making use of such a system. There are numerous calendar based time planning systems presently available, and many of these are paper based wherein the user is provided with a calendar which is segmented by a particular time period desired by the user. There are daily, weekly, monthly calendar systems and systems which incorporate combinations of these time periods to enable an individual to schedule meetings and to plan out their daily activities. What differentiates the various scheduling systems embodied in these calendars is the additional features provided by the format used to present the calendar information to the individual. These various formats are typically directed to enabling the individual to list important tasks to be accomplished during the noted time period and/or record expenses that are incurred by the individual in the pursuance of their business.

The scheduling systems of the prior art also include software based systems which typically automate the existing well known paper based systems. The software based scheduling systems provide further enhancements in the form of an address book and other such data management capabilities. These enhancements are disjunct in that they do not integrate with the basic functionality provided by the calendar system. Thus, the software based scheduling systems provide little additional functionality above and beyond those provided by the paper based systems and do not in and of themselves represent a breakthrough in the field of scheduling systems.

Therefore, the software based scheduling systems have not provided a significant enhancement over the paper based systems that have been in existence for many years. All of these scheduling systems provide useful functionality for the individual to note their appointments and to enable the individual to record additional data that is of interest to the individual but the data entry is entirely manually based and requires a significant time expenditure on the part of the individual to provide a significant amount of useful information. This user input information is typically lost at the end of the calendar period on the paper based systems although it can be maintained in the software based systems which are programmed to implement a perpetual calendar. However, the amount of information that an individual is motivated to provide to populate a software based scheduling system is small compared to the amount of information that an individual requires to make the scheduling system a truly effective personal management tool. Therefore, existing scheduling systems are of limited benefit to the users based on their inability to deliver more information to the user than what has already been manually input by the user to the system.

SOLUTION

The above described problems are solved and a technical advance achieved in the field by the personal activity scheduling system of the present invention. In the preferred embodiment of the invention disclosed herein the personal activity scheduling system comprises a software based system which makes use of the display and input/output capabilities of a computer system to enable the user to access a plethora of information heretofore unavailable in prior art scheduling systems. In particular, the computer system is typically a personal computer, laptop, notebook or other portable data processing system on which the user can load the software which represents the control portion of the personal activity scheduling system of the invention.

The personal activity scheduling system accesses data from various sources to provide the user with information that is required to enable the user to conveniently and expeditiously schedule activities without requiring access to other sources of information. In particular, the personal activity scheduling system can include schedules of various sports activities, cultural events, birthdays and anniversaries, professional meetings and deadlines, and any other temporally based items of interest to the particular individual. In addition, each of the temporally based activities can be associated with data representative of information required by the user to schedule an activity from the list of potential activities into the individual's personal calendar.

For example, a listing of ticket prices and seating arrangements for public entertainment events can be included as a database such that when the user denotes a particular event of interest, the personal activity scheduling system displays ticket price information, telephone numbers at which the user may order tickets, as well as optionally a seating chart indicating the layout of the facility at which this event is to be held. This data in the database can either be static, in that it is loaded on the individual's computer system, or can be dynamic, in that the user accesses this data automatically via modem when the user enters the particular menu portion of the personal activity scheduling system relating to ticket ordering for a particular public event. Another example of a typical external database access is for travel planning wherein the user designates certain dates for travel on the personal activity scheduling system and the system automatically accesses airline flight scheduling and hotel database information to provide the user with relevant travel information which the user can then use to make specific plans and incorporate these travel plans into the user's calendar.

While the above noted database examples are described in the form of database access via modem, some of the data can be resident on the individual's personal computer, especially in the case where the user has certain travel and entertainment preferences that render storage of this information on the individual's computer an efficient form of data management. The data that is available to the user can reside in passive form on a central database which the user can access via modem and this database can be one managed by an outside organization responsible for ticketing for the travel and entertainment events of interest to the user, or the data can be part of an Internet on-line service, such that the user can browse through all of the information of interest to the user and accomplish the scheduling and ticketing functions via the user's computer and the Internet service provider.

Finally, the personal activity scheduling system can provide other temporally based and nontemporally based functions which enhance the usefulness of the individual's calendar. These additional functions can include a trivia quiz or trivia readout indicating events that took place on this day in prior years and the trivia embodiment of this function can include a scoring function which enables the user to test their knowledge against the questions built into the personal activity scheduling system. Furthermore, an automated coupon delivery system can be embodied wherein coupons are automatically available to the user on certain predetermined dates and the user can print out these coupons for redemption at whatever commercial establishment is sponsoring these coupons. Advertisements can be included in the system or downloaded into the system. These advertisements can be related to the particular information that the user is accessing and/or can be time varying. Thus, when the user accesses airline flight information, an advertisement for a particular airline may be concurrently displayed, with the information in the advertisement being a function of the travel information requested by the user.

It is obvious that there are numerous potential combinations of these functions which can be implemented using the architecture and functionality of the personal activity scheduling system of the preferred embodiment of the invention which alternatives are intended to fall within the scope of the claims appended hereto.

DETAILED DESCRIPTION

Figure 1:
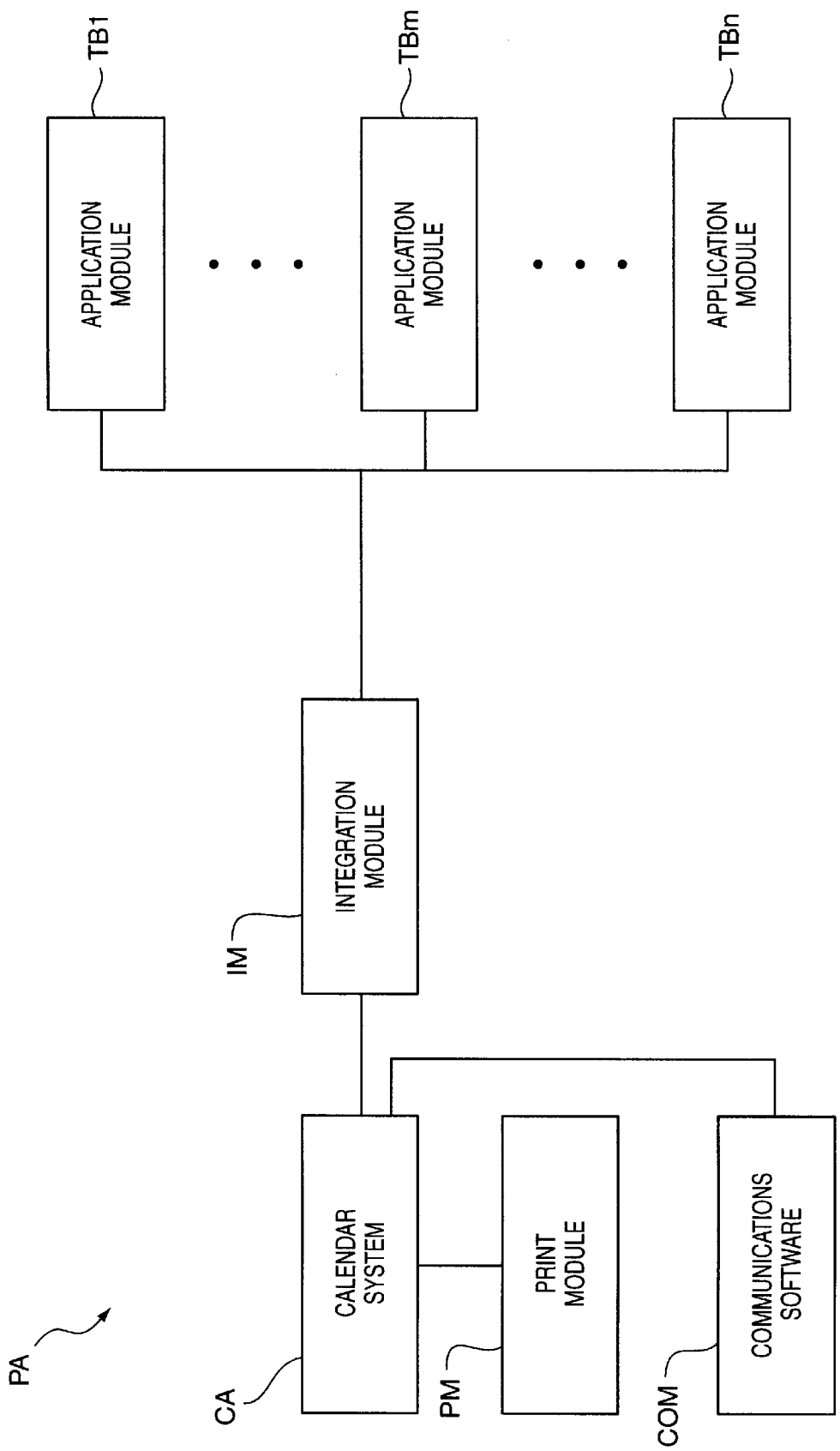
FIG. 1 illustrates a schematic diagram of the personal activity scheduling system of the preferred embodiment of the invention.
Figure 2:
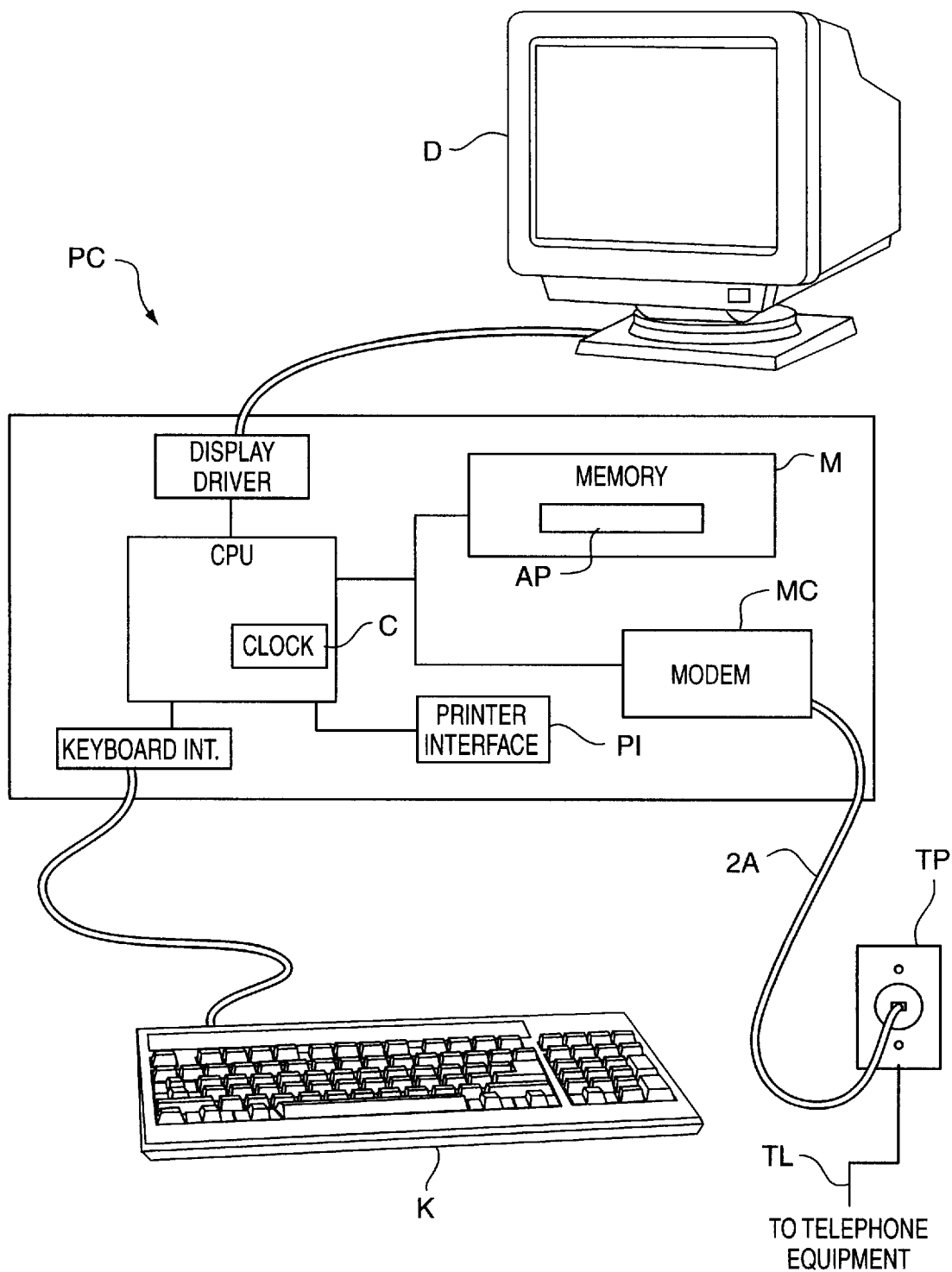
FIG. 2 illustrates the architecture of a typical processor on which the personal activity scheduling system of the present invention is operable.

The personal activity scheduling system of the present invention comprises a temporally based system which enables a user to schedule and track various activities by incorporating third party data related to the activities into a calendar system for the activity scheduling function. In the preferred embodiment of the invention disclosed herein, the personal activity scheduling system is shown as a combination of hardware and software which are cooperatively operative to provide the user with information which the user requires to identify and efficiently schedule various activities that are of interest to the user. The various elements shown in FIGS. 1 and 2 represent but one technological implementation of this system and are used to illustrate the concepts of the invention rather than to limit in any way the scope of the claimed invention. The personal activity scheduling system as seen by the user comprises a display device and a data input device, such as a keyboard and/or mouse, which are connected to a user terminal device. The user terminal device is equipped with a central processing unit and memory, typically including a hard disk drive, on which the software is resident. This system may optionally be equipped with a printer device and/or a modem which enable the user to output information in paper form and to input/output data in electronic form, respectively.

System Architecture

The architecture of the preferred embodiment of the invention is disclosed in FIG. 1 and FIG. 2. In particular, FIG. 2 illustrates the architecture of a typical user terminal device PC on which this system is operable. The apparatus comprises a standard user terminal device PC, which is equipped with a display D, a central processing unit CPU, memory M, input device (such as keyboard K), and, optionally, a modem MC which is connectable to the telephone line TL for communication with various other processing systems and a printer interface Pl, which is connectable to a printer (not shown). This user terminal device PC is of a class of devices which presently include, but are not limited to: personal computers, laptop computers, and notebook computers. The memory M preferably includes the personal activity scheduling system AP of the present invention, although it is envisioned that some of the functionality disclosed herein can reside on another processor which is accessible by the user via the modem MC and telephone line TL. For example, some of the third party information, such as the scheduling data, can reside on an Internet server, which is accessed by the user as is described in further detail below. The maintenance of this information and its use can also be implemented in part on the other server.

The personal activity scheduling apparatus AP is shown in block diagram form in FIG. 1 and comprises a calendar system CA which interconnects with the clock C of the central processing unit CPU to generate and maintain the calendars described below. The calendar system CA preferably comprises a module which dynamically generates a present date calendar, which date is indicated by the system clock C, and presents a display to the user on display D of this present date calendar in the form selected by the user. In addition, at least one, and preferably a plurality of application modules TB1–TBn (also termed time based software modules hereinbelow) are included, each of which generates data indicative of events which may be of interest to the user. The events can be time-based or situational-based and, for the purpose of illustration, the time-based applications are described herein. One or more of these application software modules TB* can reside external to the user terminal device PC, such as on an Internet site as noted above. For the purpose of this description, the application software modules TB* are described as resident in the user terminal device PC. An integration module IM is also provided which functions to receive selected application data produced by the application software modules TB* and integrate this selected data into the calendar produced by the calendar system CA. Optionally, communication software COM is included to utilize the modem device MC to interconnect this system with other processors via the telephone line TL in well known fashion. A print module PM is also optionally included and comprises a printer drive software which operates with the printer interface Pi in well known manner to activate a printer connected to this system. In any case, the system integrates third party information into the calendar system to enhance the functionality of the calendar system. Much of the third party data is time-based and lends itself to the calendar function, but this data can include any application data, such as situational-based data, news information, E-Mail data, and the like.

Integration Module

The integration module IM functions as a database, which stores data in memory M for retrieval on an organized basis for the calendar system CA for presentation to the user via display D. In particular, the integration module IM responds to user input from the calendar system CA, in the form of data input via the display screens described below, to identify which of the application modules TB1–TBn contain the requested data (such as module TB1). The integration module IM excerpts the requested data from the selected application module TB1 and transmits this data to the user via the appropriate screen displays. The user selected function can result in the retention of the excerpted data in the calendar system CA, especially in the case where the application module TB1 represents third party data which is resident in a processor system external to the user terminal device PC (such as a modem connected Internet server). Alternatively, the data excerpted represents transient information, to be displayed to the user and then discarded once the user selected function has been exited. The specific applications of this function are evident from the following description of the various functions implemented in the personal activity scheduling system PA.

It is expected that the implementation of the integration module IM is in the embodiment of a database, although any other comparable data processing system can be used in place of the database or in conjunction with the database to implement the functions described below. Thus, data filters, user preference monitoring systems, geographic location determination systems, query systems, graphic display generation systems, and the like can be incorporated into the integration module IM as a function of the level of sophistication the software designer wishes to achieve. These systems are presently available and well within the scope of ability of one skilled in the art to combine with a database to implement the functions described below.

Daily Calendar

Figure 3:
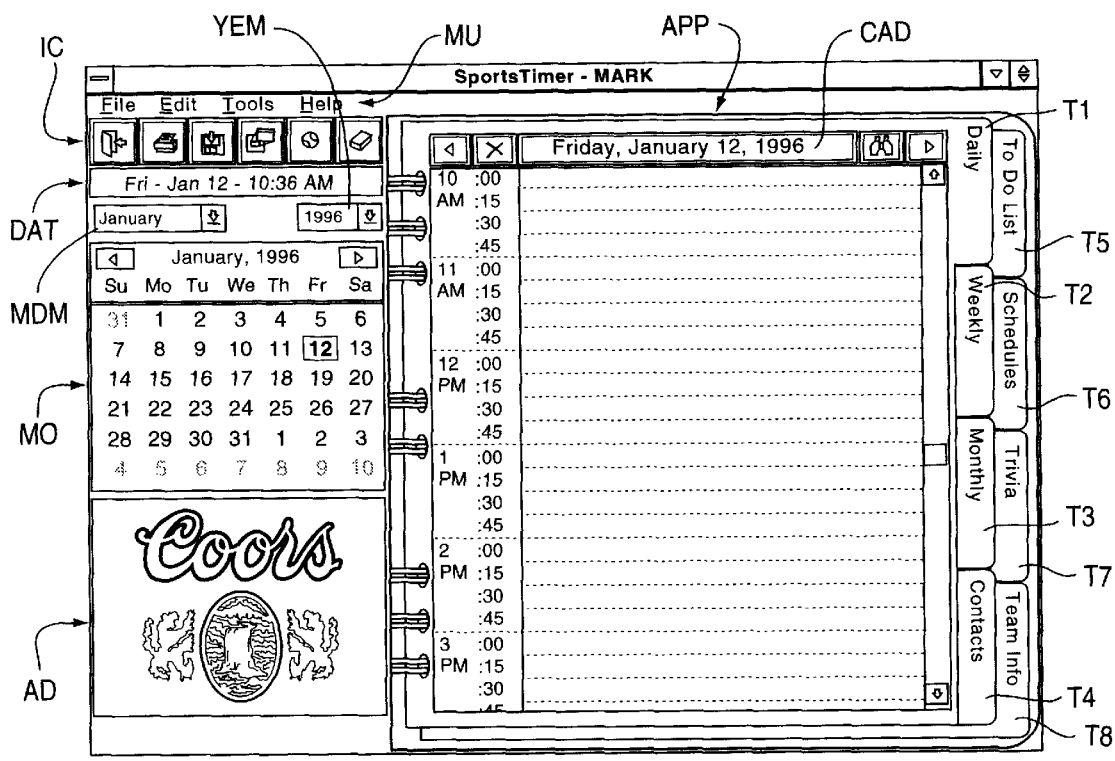
FIGS. 3–25 illustrate various screen displays produced by the personal activity scheduling system while active in various operational modes.

The user of the personal activity scheduling system AP can have a preference as to the mode of presentation of the calendar data produced on the display D. Since this preference or the user's needs can vary, a plurality of calendar display modes are possible. To simplify the user's choice, the basic format of the calendar presentation illustrated as the preferred embodiment of the invention is shown in FIG. 3 as appointment book, open to a particular page APP representative of the present day, and having a plurality of tabs T1–T8 which represent the various major selections available to the user. The number of tabs are a function of the hierarchical architecture and number of functions implemented in the system. Eight tabs are shown here for simplicity of illustration.

The presently active tab T1 shown in FIG. 3 is "Daily" which results in the calendar system CA presenting an appointment book presentation of time entries. It should be noted that to produce a display of clarity and extent that is efficient, the times indicated begin with the hour that matches the present clock time. Thus, the present date CAD is displayed at the top of the appointment book page APP, which date and the present time is also displayed to the left of the appointment book page APP in field DAT. As can be seen from the time shown therein, it is 10:36 AM and the appointment book therefore begins its appointment book page APP display at 10AM, the present time (on an hourly basis). The appointment book page APP display presents a plurality of hourly slots for entries (six being shown in FIG. 3), and time slots preceding and following those displayed can be accessed by the user activating the up and down arrow icons displayed on the right hand side of the page, in well known fashion, to view other time periods for this date. In addition, a pair of arrow icons are provided adjacent the displayed date filed DAT to enable the user to switch the appointment book page APP display to earlier or later dates to view the same format display for those selected dates. Furthermore, as the hour changes, the personal activity scheduling system AP can scroll the screen display to reflect the time change. Thus, appointment book page APP can always maintain the present time as the top-most entry on the display.

A monthly calendar MO is also shown to the left of the appointment book page APP display to enable the user to have ready access to information regarding the remainder of the month. The selection fields (MOM, YEM) located above the displayed monthly calendar MO enable the user to change the presented month MOM and year YEM by activating the scroll icons located adjacent to these entries. Furthermore, a menu MU is presented on the top of the screen to enable the user to access "Help", "Tools", "Edit" or "File" options as is commonly found in computer programs. The tab options T* displayed on the right hand side of the appointment book page APP are also replicated in icon form IC below the menu bar MU. A field AD is optionally provided, shown in the lower left hand corner of the display, for display of a logo, typically indicative of the manufacturer or distributor of this personal activity scheduling system, or any advertiser who wishes to present their commercial information, as described below. This field AD can optionally be used to display messages or other information to the user.

In order to simplify the following Figures, the specific references to the elements illustrated in FIG. 3 are not repeated in these figures, except where believed useful for an understanding of the description of these figures.

Figure 4:
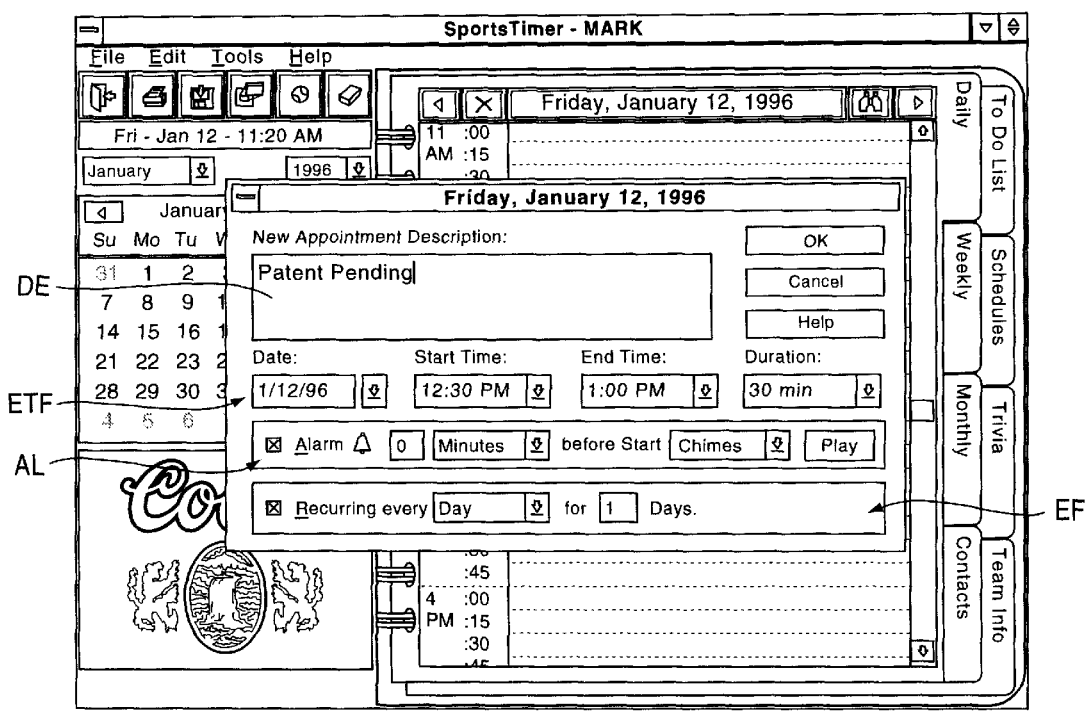

FIG. 4 illustrates a screen display which is presented to the user when the "edit" option is selected from the menu bar MU and the "new" (not shown) submenu entry is selected. Alternatively, the edit function can be activated by clicking on the icon or double clicking on the listed event. This display comprises an edit window EF overlaid on the basic appointment book page APP display of FIG. 3. The edit window EF enables the user to manually enter event information into the calendar system CA. In particular, a description field DE is provided to enable the user, using keyboard K, to type in a textual notation for display on the appointment book page APP of the calendar system CA for the date and time selected via the input fields ETF located below the textual entry field DE. In addition, an alarm menu AL is provided to enable the user to turn on the alarm function by selecting ("X") "Alarm" and setting the length of time prior to this scheduled event the alarm should be generated. The user can also select the type of alarm indication, from a menu of possible visual and audible alerts that can be produced by the user terminal device PC. An event repeat function is available to enable the entered event to be presented a plurality of times, such as a weekly meeting at a predetermined time. The repeat function eliminates the need for the user to seriatim enter the same information on successive dates. Once the user is satisfied with the new appointment entry input via the edit window EF, it is entered into the calendar system CA by operation of the "OK" icon.

Figure 5:
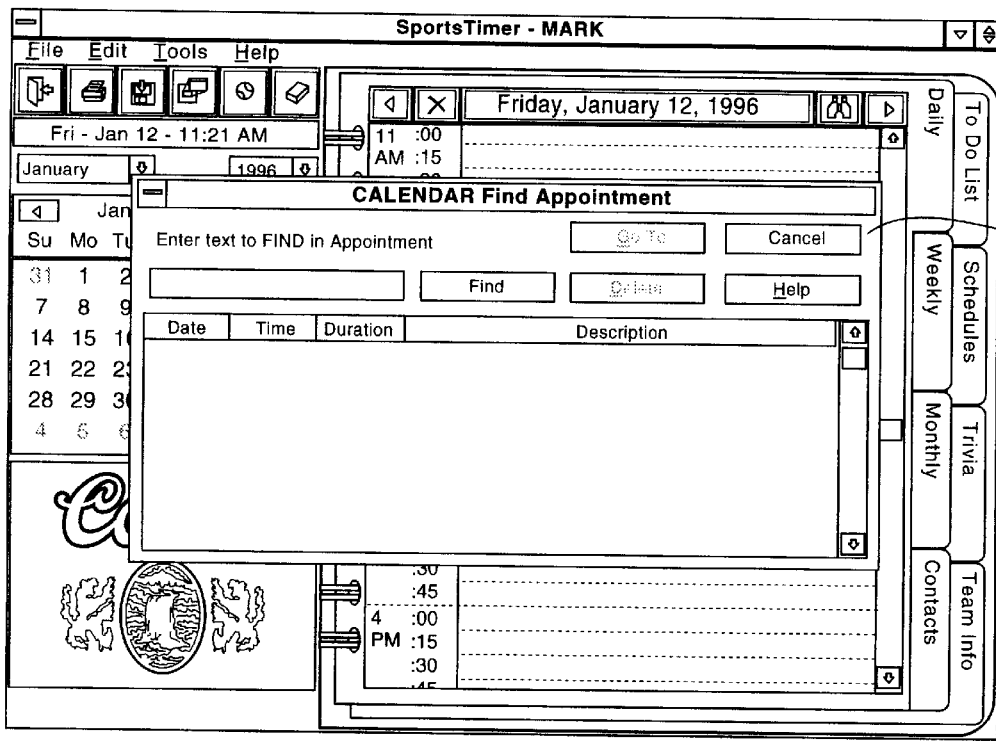

FIG. 5 illustrates a screen display which is presented to the user when the "menu" option is selected from the menu bar MU and the "find" (not shown) submenu entry is selected. This display comprises a window FAW which enables the user to locate appointment information that had previously been entered into the calendar system CA. In particular, a description field is provided to enable the user, using keyboard K, to type in a textual notation indicative of the content of a selected entry on the appointment book pages of the calendar system CA. The user then activates the "Find" icon which activates the personal activity scheduling system PA to locate the date and time for the appointment identified by the textual entry field of the locate appointment window FAW.

Figure 6:
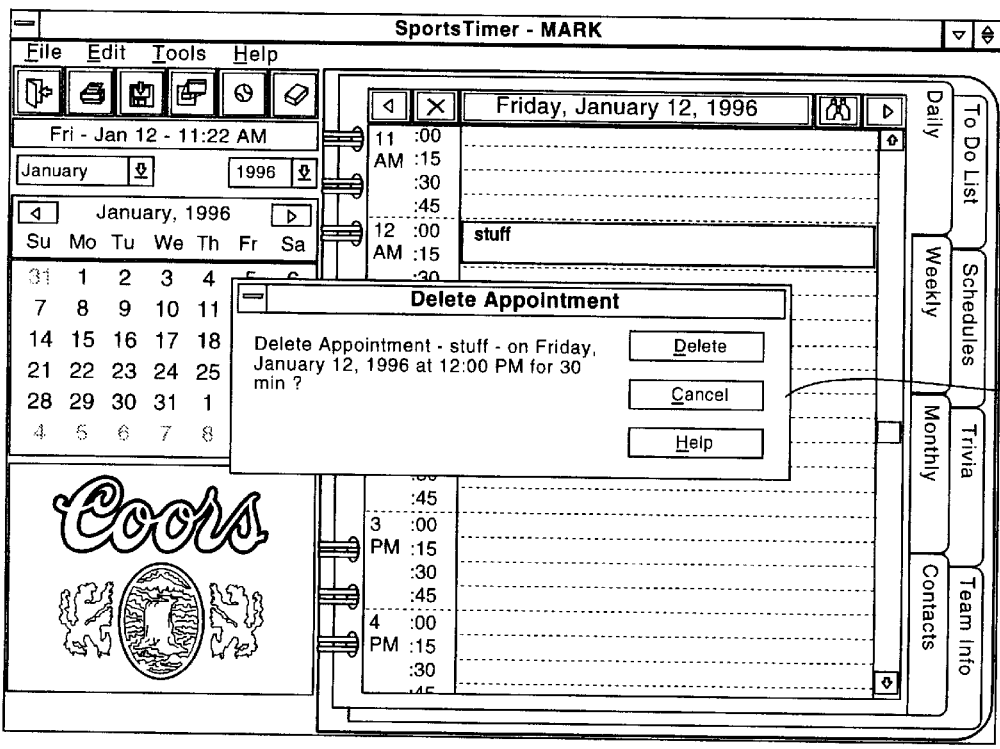

FIG. 6 illustrates a screen display which is presented to the user when a particular appointment entry is selected and then the "Menu" option is selected from the menu bar and the "Delete" (not shown) submenu entry is selected. Alternatively, this function can be activated by clicking on the icon or double clicking on the listed event. This display comprises a window DAW which enables the user to remove appointment information that had previously been entered into the calendar system CA. In particular, the calendar system CA presents the appointment data and queries the user whether indeed this appointment should be deleted. If the user so desires, the "Delete" icon is activated to remove the appointment from the calendar system CA.

Figure 7:
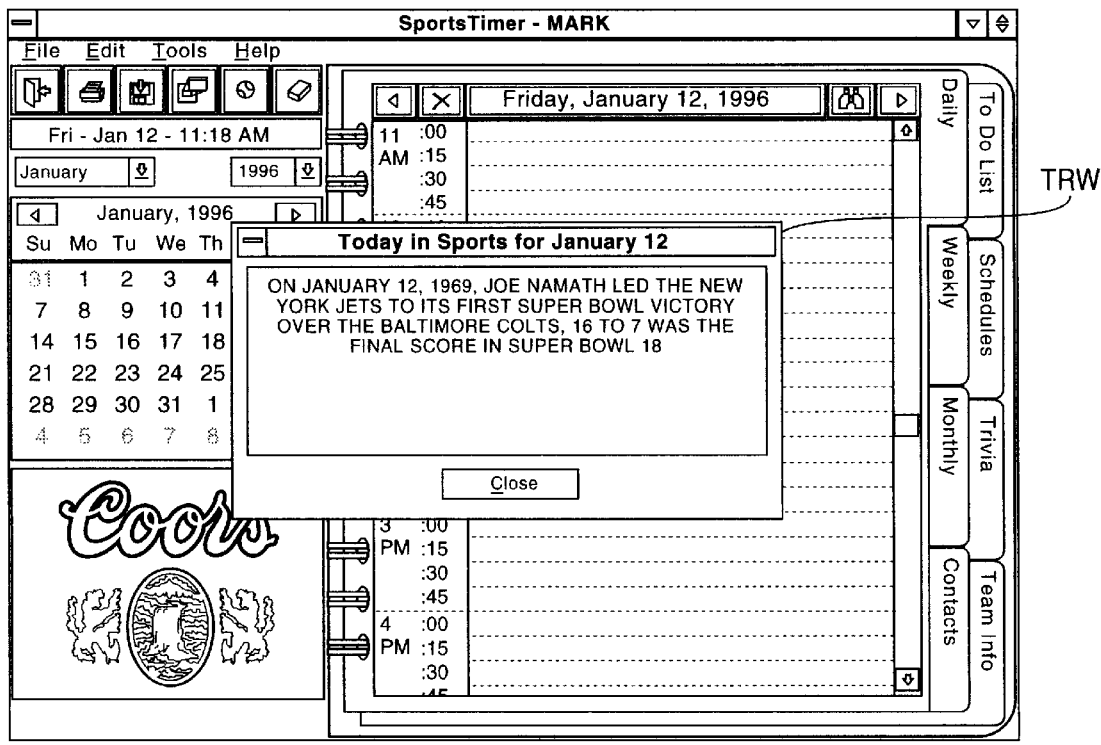

FIG. 7 illustrates a screen display comprising an information window TRW which can be presented to the user at a selected time or via operation of a selected icon to present any sort of information, such as a bit of trivia, typically relating to the present date. This trivia is obtained from the trivia module TRm (FIG. 1) and can be any information, such as the notation of an important event which occurred on this date, or other such time based data, even a present day weather forecast for this locale in the instance when the personal activity scheduling system PA is connected to a central processor, such as an Internet server. The display of FIG. 7 illustrates a bit of sports trivia relating to the present date as an example of a typical output.

Weekly Calendar

Figure 8:
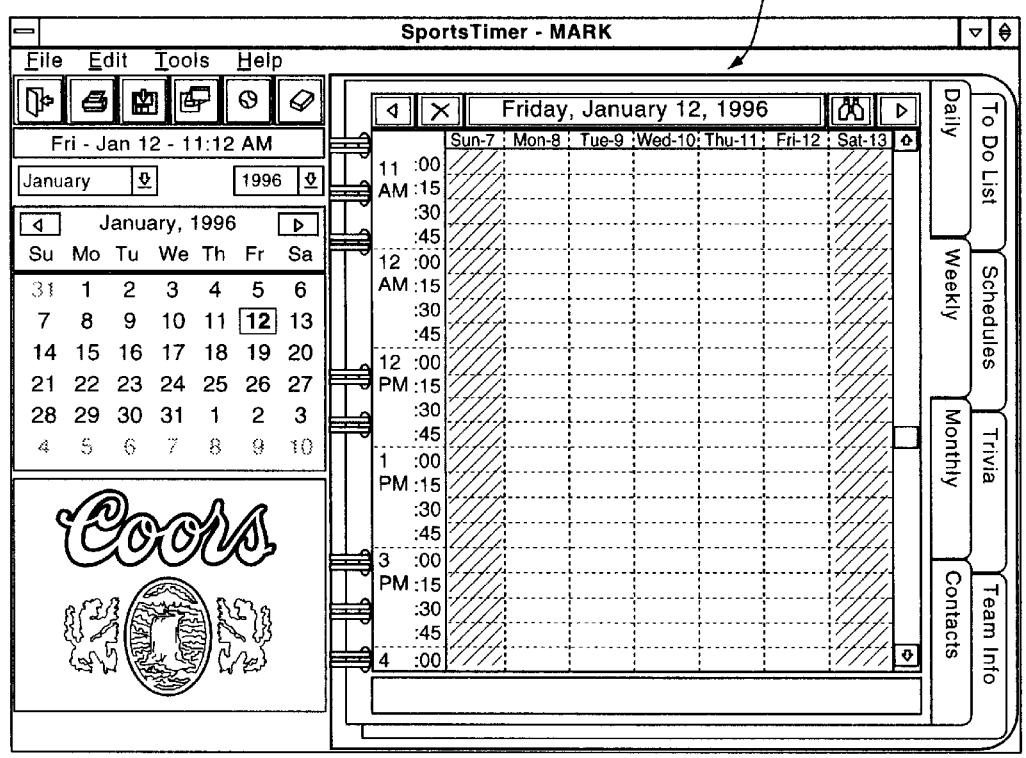

FIG. 8 illustrates the display when the user presently has selected the T2 tab "Weekly", which results in the calendar system CA presenting an appointment book presentation WEC of time entries for all the days of the present week. It should be noted that to produce a display of clarity and extent that is efficient, the times indicated begin with the hour presently matching the clock time. Thus, the present date is displayed at the top of the appointment book page, which date and the present time is displayed to the left of the page display. As can be seen from the time shown therein, it is 11:12 AM and the appointment book therefore begins its display at 11 AM, the present time (on an hourly basis). The display presents a plurality of hourly slots for entries (six being shown in FIG. 8), and time slots preceding and following those displayed can be accessed by the user activating the up and down arrow icons displayed on the right hand side of the page, in well known fashion, to view other time periods for this date. In addition, a pair of arrow icons are provided adjacent the displayed date to enable the user to switch the display to earlier or later dates to view the same format display for those selected dates. Furthermore, as the hour changes, the personal activity scheduling system AP can scroll the screen display to reflect the time change. Thus, appointment book page APP can always maintain the present time as the top-most entry on the display.

As with the Daily display, the remainder of the screen presents a monthly calendar, a menu, as well as the tab options. A field is optionally provided, shown in the lower left hand corner of the display, for display of a logo, typically indicative of the manufacturer or distributor of this personal activity scheduling system. This field can optionally be used to display messages or other information to the user.

Monthly Calendar

Figure 9:
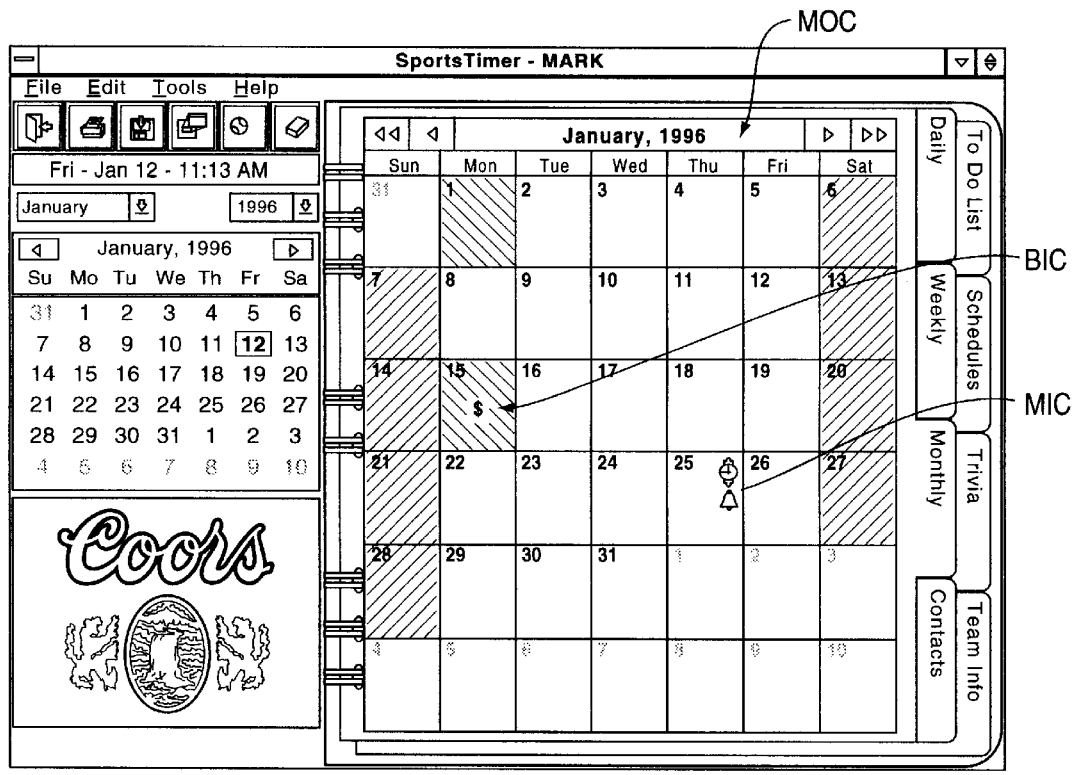

The presently active tab T3 shown in FIG. 9 is "Monthly" which results in the calendar system CA presenting a monthly calendar presentation MOC of dates. It should be noted that to produce a display of clarity and extent that is efficient, icons BIC, MIC are used to denote important events. Thus, the present date is displayed at the top of the calendar page, with the date and present time being displayed to the left of the page display.

As with the Daily display, the remainder of the screen presents a monthly calendar, a menu, as well as the tab options. A field is optionally provided, shown in the lower left hand corner of the display, for display of a logo, typically indicative of the manufacturer or distributor of this personal activity scheduling system, or any advertiser who wishes to present their commercial information. This field can optionally be used to display messages or other information to the user.

Contacts File

Figure 10:
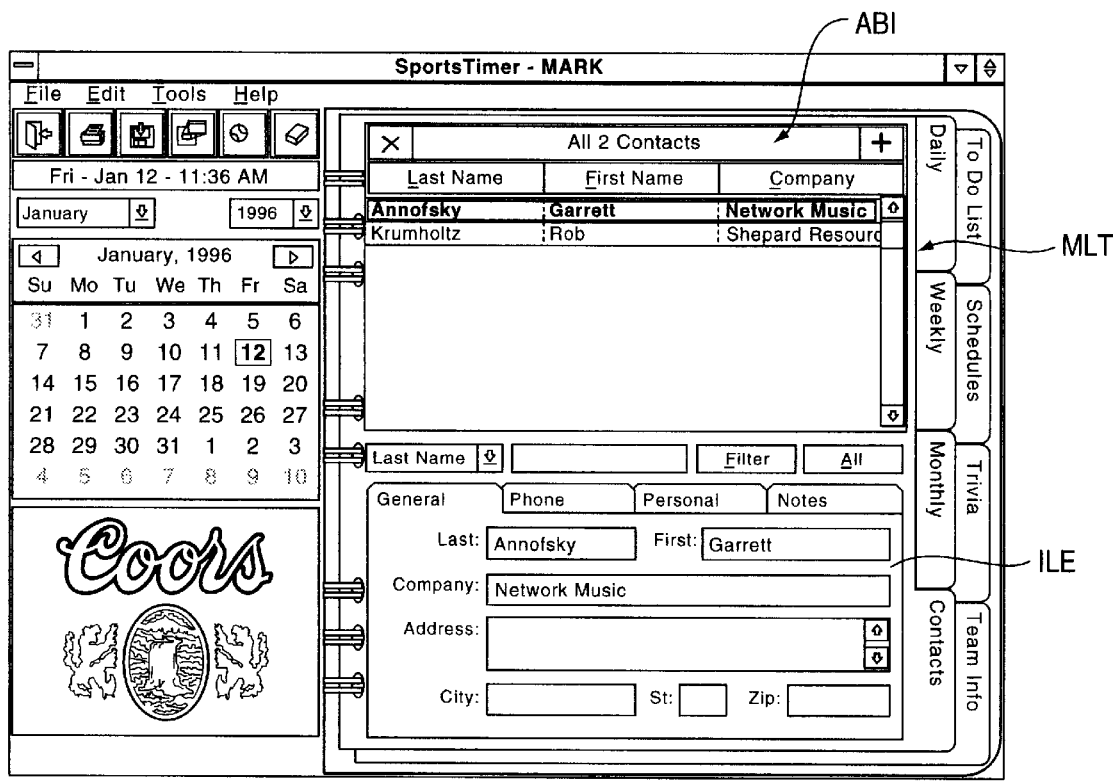
Figure 11:
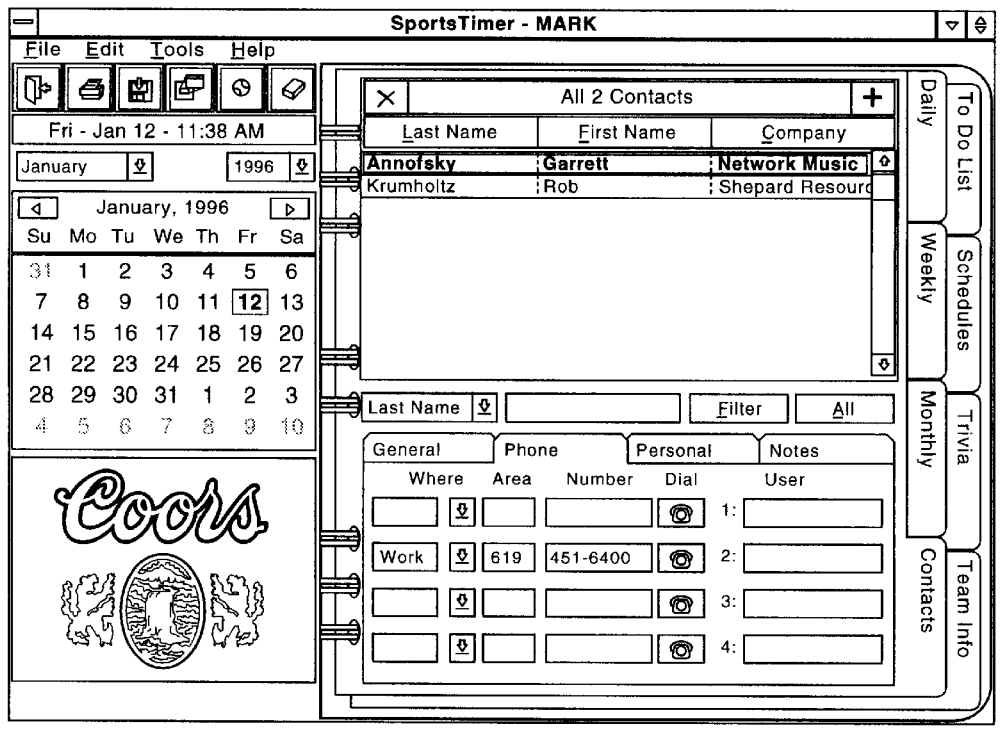

FIG. 10 illustrates the display produced when the user activates the "Contacts" tab, T4. The display comprises a window ABI which comprises a listing of "address book" information and is divided into two segments: master list MLT, individual entry ILE. The top segment MLT of the display presents a listing of all entries, noting last name, first name and company, which list can be scrolled up or down using the arrow icons located along the edge of the top segment MLT of the display. The bottom segment ILE of the display presents the specific data for a selected entry. The first tab "General" in this segment presents a set of fields which represent the basic address information for the identified individual. Activation of the "Phone" tab produces the display shown in FIG. 11, which presents multiple entries for the individual identified in the individual entry shown in FIG. 10. In addition to the listing of telephone numbers, the telephone icon listed under "Dial" can be activated by the user to automatically dial the listed telephone number. Thus, when the user activates one of the telephone icons on FIG. 11, the communications software COM is activated to retrieve the listed telephone number from the contacts database and automatically dial this number over the telephone line connection TL shown in FIG. 2. The user can then communicate via a telephone device (not shown) associated with the user display terminal PC or can exit this program and communicate via keyboard communication using other software as is well known in the art.

Figure 12:
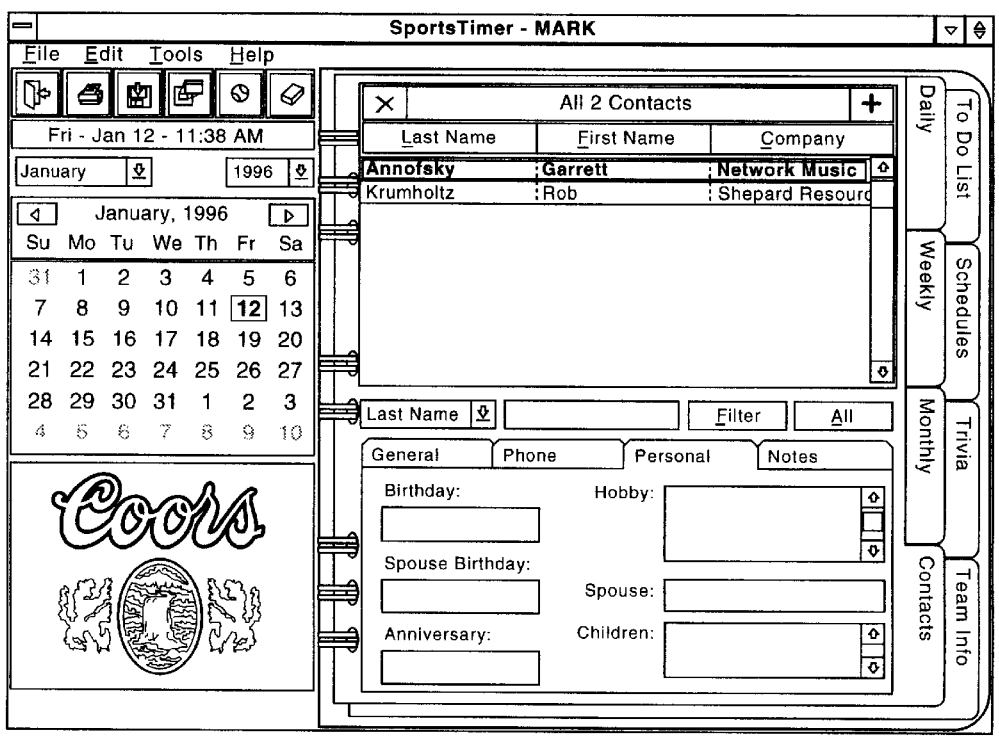
Figure 13:
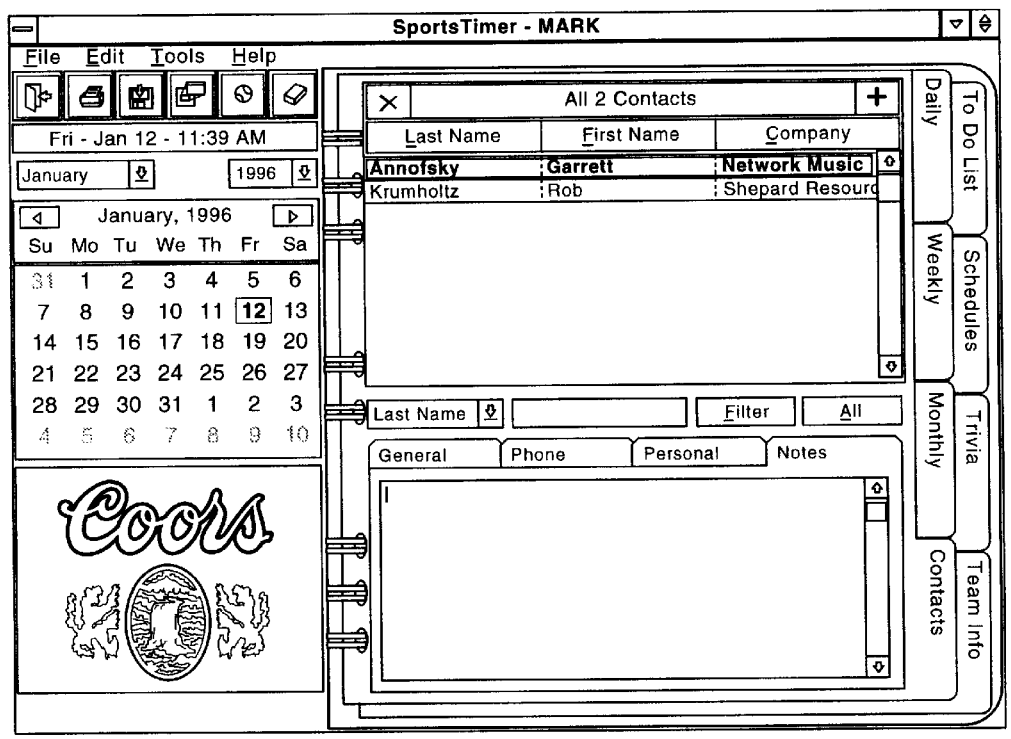

FIGS. 12 and 13 illustrate, respectively, the display screens that result from the activation of the "Personal" and "Notes" tabs of the display of FIG. 10. These two displays present the user with information, and the ability to input information, relating to personal facts about the identified individual and general reminder notes. The entries in the various address book items can be edited and deleted in a manner analogous to that noted above with respect to the appointment book calendar APP.

To Do List File

Figure 14:
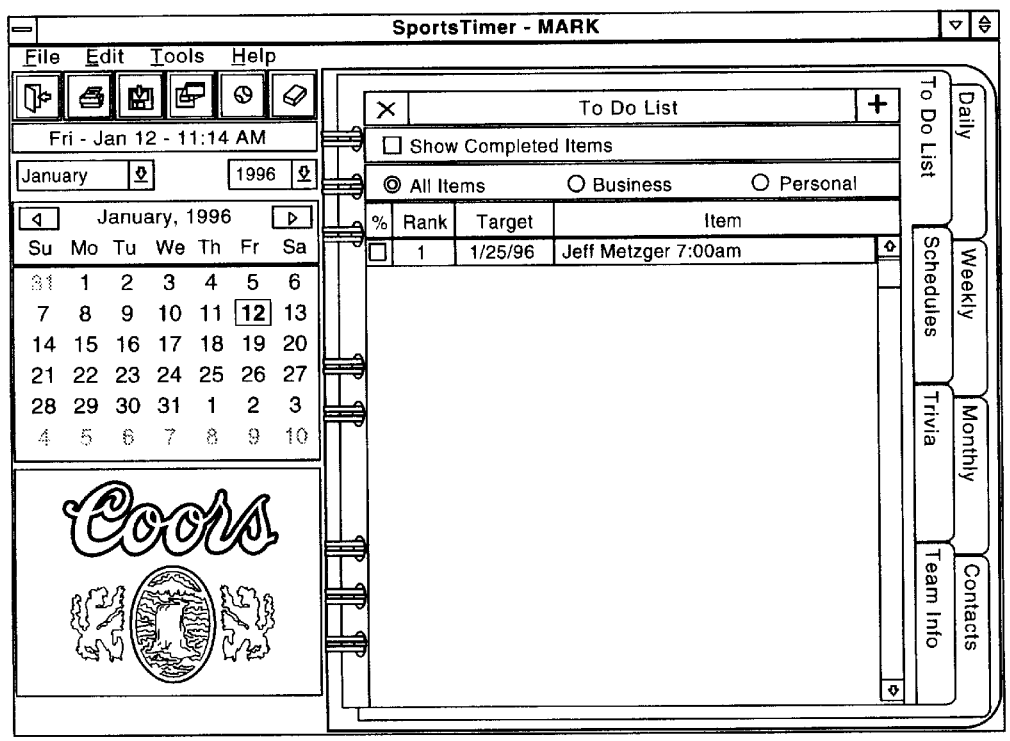
Figure 15:
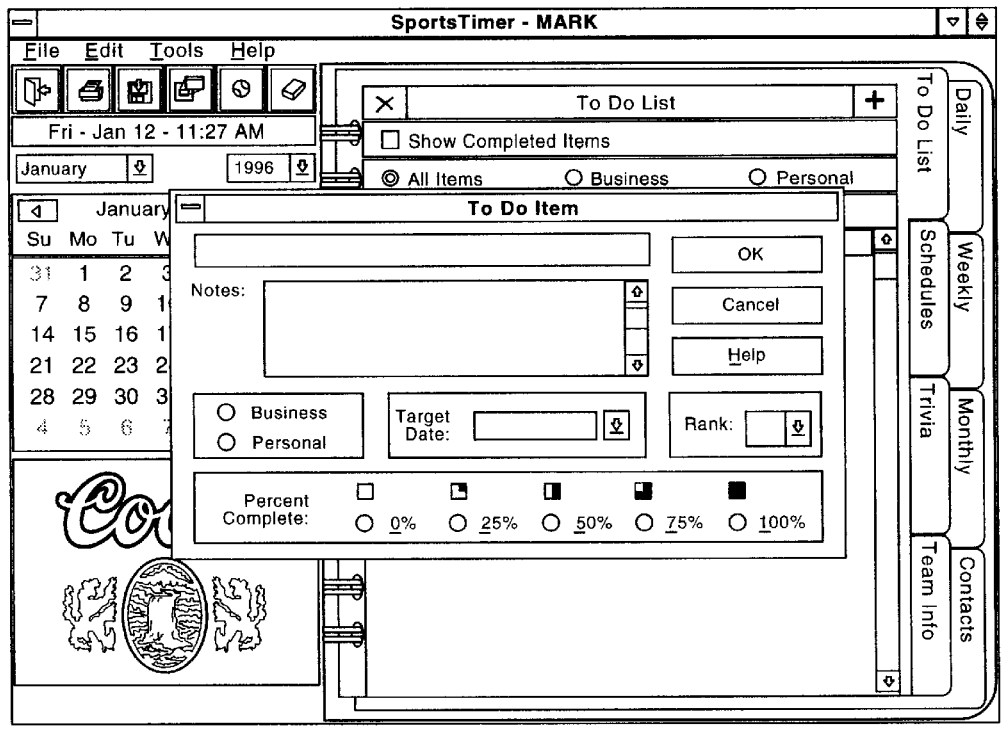

FIGS. 14 and 15 illustrate displays produced when the user activates the "To Do List" tab, T5 and the edit capability for this display, respectively. The To Do List comprises a plurality of user produced action entries in rank order. The user can select, via the icons located above the list, to display all items or only personal/business items. The items are assigned a % complete factor by the user to indicate the user's progress toward completion of the noted item. In addition, a rank ordering of the item is assigned by the user to enable the system to list the items in order of user preference. A target date can be assigned to each item and the user provides a brief description of the item as well as optional more detailed notation of the item.

The listed items, when assigned a date, can be integrated into the calendar system via the production of an icon representation on the calendar display as noted above to remind the user of the presence of an item requiring action.

Schedules and Team Information

Figure 16:
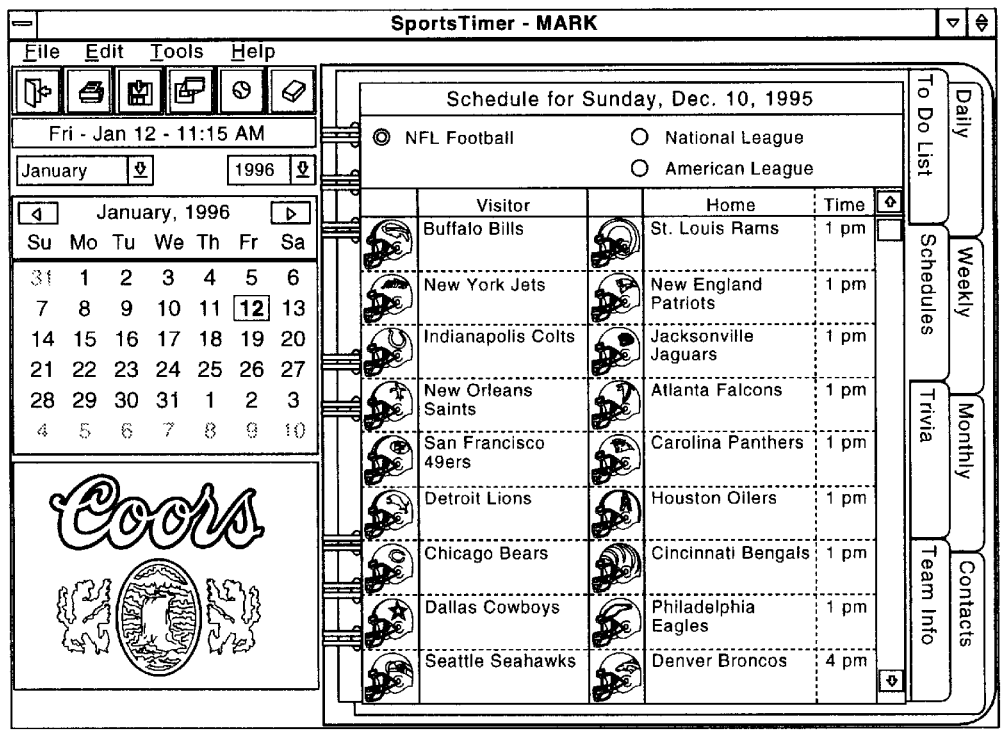

FIG. 16 illustrates the display which is produced by the user activating the "Schedules" tab, T6. The schedule illustrated in FIG. 16 is an example of a schedule which can be maintained within the personal activity scheduling system or can be accessible via communications connection to an external database. The schedule is that of all professional football events which are scheduled to take place on the designated date. This display indicates the various games, their times and an indication of the contestants (with optional team insignia). Such schedules can be maintained for all sports and/or cultural events for the city in which the user lives, thus being both temporal and geographic in nature. Alternatively, the schedules can be customized by the user to display only schedules for selected event classes, certain teams, certain geographic locations. The information available to the user is relatively unlimited, yet its integration into the personal activity scheduling system PA can be simplified by the use of filtering software which is part of the time integration module IM. Furthermore, the schedule information can be related to items of a more user-specific or personal nature, such as school events, family events, religious events, and the like.

Figure 17:
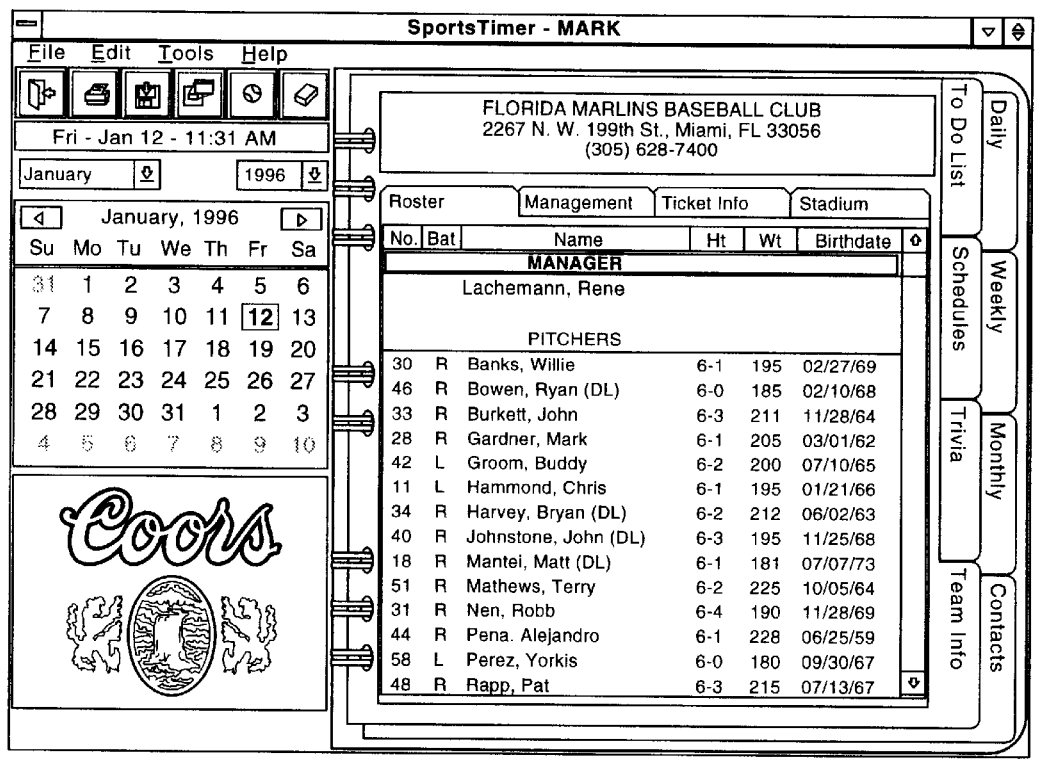
Figure 18:
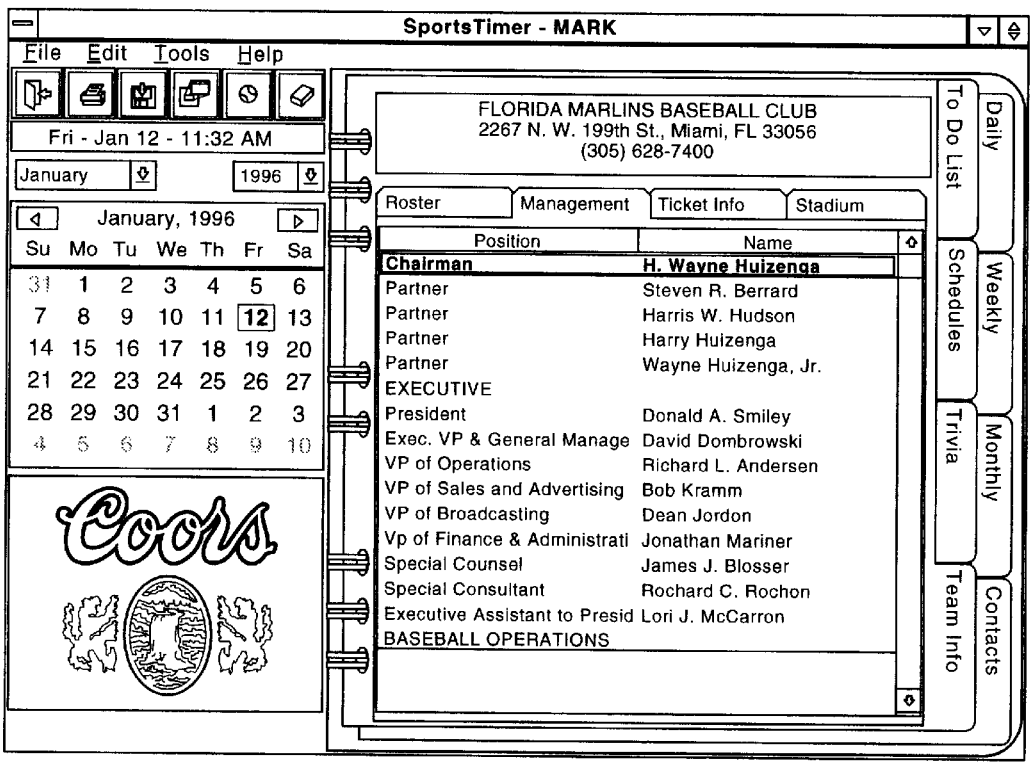

Once the user has selected an event, or if the user simply seeks general information, the user can activate the "Team Info" tab, T8to obtain the display of FIG. 17, which is a listing of team members and their vital statistics. The user can change the subset of team information via clicking on the team name TN field to sequence through the various teams stored in the database. The initial team selection can be automatically tied to an event selection from the previous screen if so desired. The team information display includes a number of subsection tabs: Roster (RO), Management (MA), Ticket Info (TI), and Stadium (ST). If the user activates the "Management" tab MA on this display, the screen of FIG. 18 is presented, which provides team administration information.

Event Information

Figure 19:
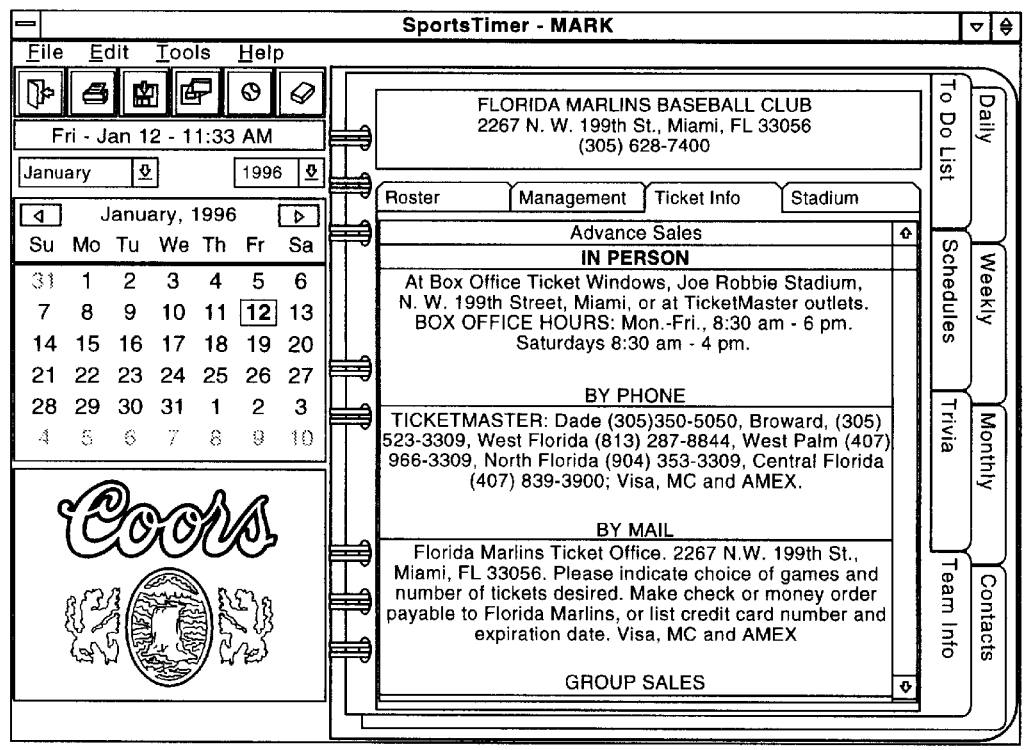
Figure 20:
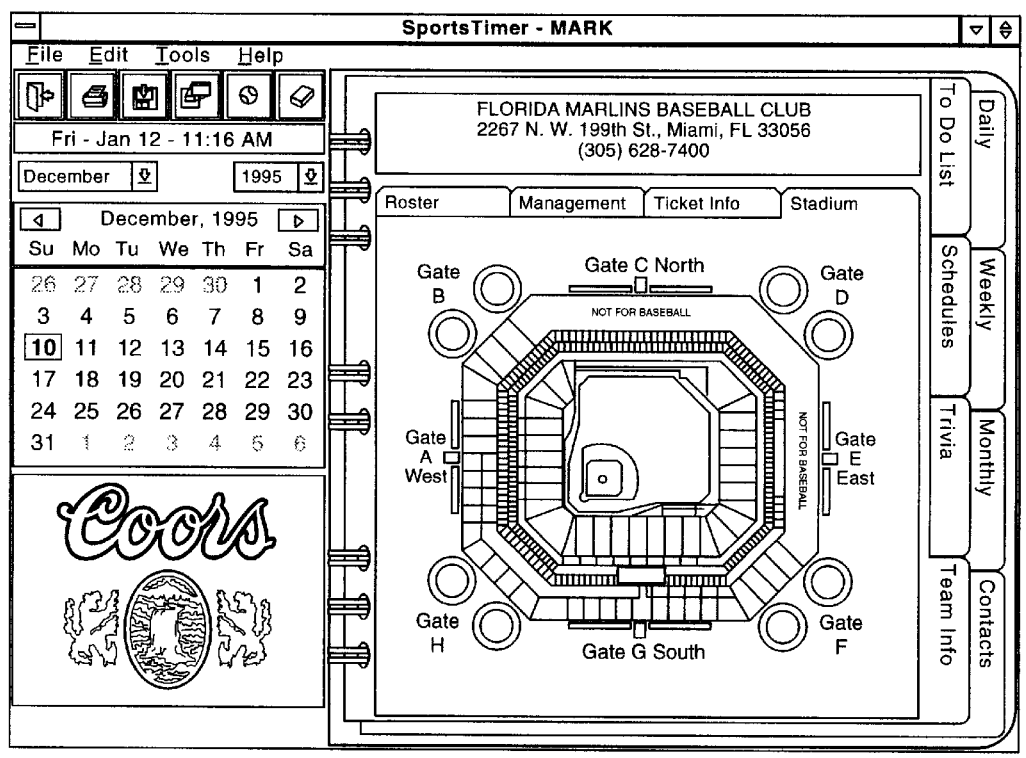

Within the tab "Team Info", there is the subsection tabs of Ticket Info TI and Stadium ST, which comprise a category which can be termed "Event Information". The benefit of incorporating the event schedule information into the personal activity scheduling system PA is that the user can dynamically select events of interest, obtain relevant information relating to the selected event and order tickets online using the personal activity scheduling system PA. This is accomplished by activating the "Ticket Info" subsection tab TI of the personal activity scheduling system PA to produce the screen of FIG. 19. This information indicates the various sources available to obtain tickets for the identified event. In addition, ticket price information (not shown) can be maintained in the personal activity scheduling system PA so that the user can make price selections. The personal activity scheduling system PA can include a print software module PM, activated by the user selecting the "By Mail" field to print, via a printer (not shown) connected to the user terminal device PC, a preformatted ticket order form which the user can edit to order the number of tickets at the noted price (seat selection) for the identified event. The printed ticket order form can then be deposited in the mail by the user. Alternatively, the user can activate the "Contacts" tab, T4, to automatically dial the identified ticket office as noted above to order tickets by telephone. An additional capability provided by the personal activity scheduling system PA is shown in FIG. 20 wherein a plan view of the event arena is produced when the user activates the "Stadium" subsection tab ST. This display enables the user to view the seat selection choices available for the identified event. In a transaction mode via telephone, the user can immediately identify the seat location for available seat selections offered by the order taker during the ticket ordering process. This capability is especially significant where the user is unfamiliar with the facility and ticket prices vary significantly with locus and specific event.

Figure 21:
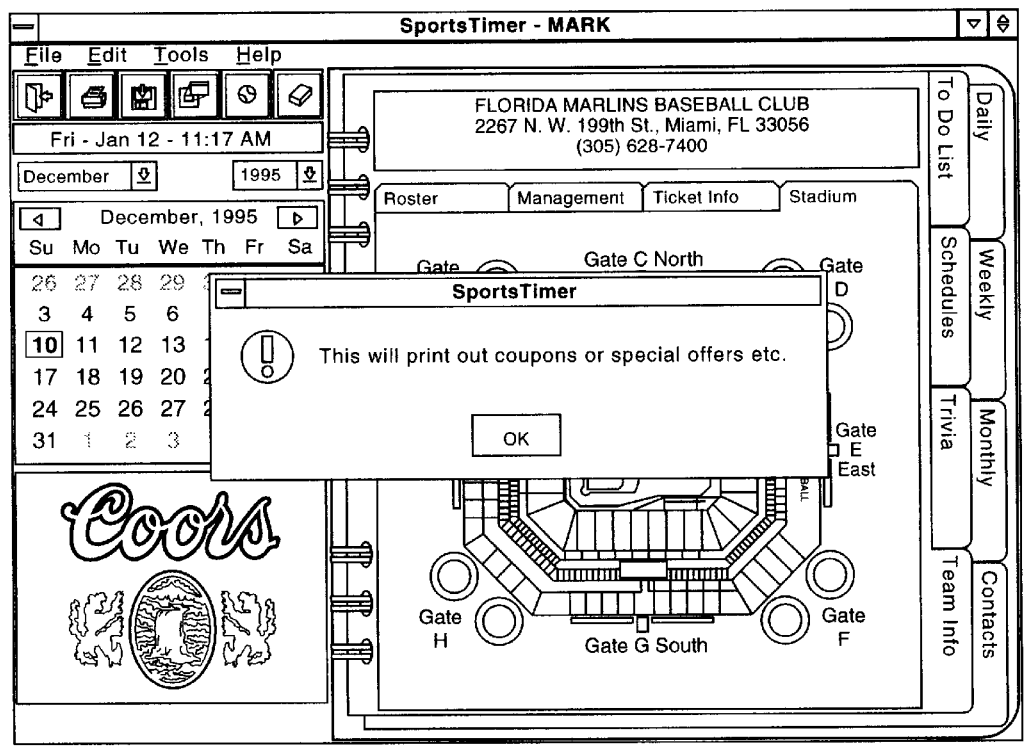

The dynamic ticket ordering capability thereby integrates many functions which are presently disjunct and represent a burden to the user. Many special events (circus, concert) have unique seating arrangements and the user is typically unable to view the offered seating arrangements until the user travels to the ticket office. The user must then make a selection while in line, without time for adequate reflection. The above-described personal activity scheduling system PA provides immediate access to ticket and seating information in the comfort of the user's home or office, and enables the user to order tickets without the need to access another system or personally visit the ticket office. The information displayed in the above-described screens may be stored in the memory of the user's display terminal or may be accessed via the communications software. For special events, the data may reside on a central ticket order system and can be downloaded to the personal activity scheduling system PA via modem MO as part of the ticket ordering process. Furthermore, the screen of FIG. 21 can be displayed for selected events, wherein sponsors of the events offer discount coupons to individuals who order tickets for the event. The user can elect to receive the coupons via the user's printer by simply selecting the "OK" icon displayed on the screen.

The above-noted event information is presented in the form of sports events, although the nature of the event can be anything that is of interest to the user. The events can be cultural, social, religious, political, business conference, trade shows, or the like.

Financial Transactions

An additional personal event manager capability is the financial transaction capability offered by the personal activity scheduling system PA. The events programmed into the personal activity scheduling system PA under "Schedules" can be routine periodic financial transactions, such as mortgage payments, car payments, credit card payments, utility bills, and the like. The user, in response to the $ icon (shown as BIC on FIG. 9) appearing on the calendar, can activate the communication software COM to establish a communications connection to the user's bank, as identified in the "Contacts" listing and automatically dialed as described above. The electronic banking capability of the user's bank is coordinated with the present system to sequence through the financial transactions scheduled for the present date and selected by the user for execution. The user can thereby use the personal activity scheduling system PA as a reminder of payments due and as a bank access system to transact the financial business identified by the personal activity scheduling system PA. Thus, the time based data indicative of loan payment schedules can be output from a loan payment module to the integrator IN for merging into the calendar system CA as described above. The automatic reminders thereby obviate the need for loan payment books.

Figure 23:
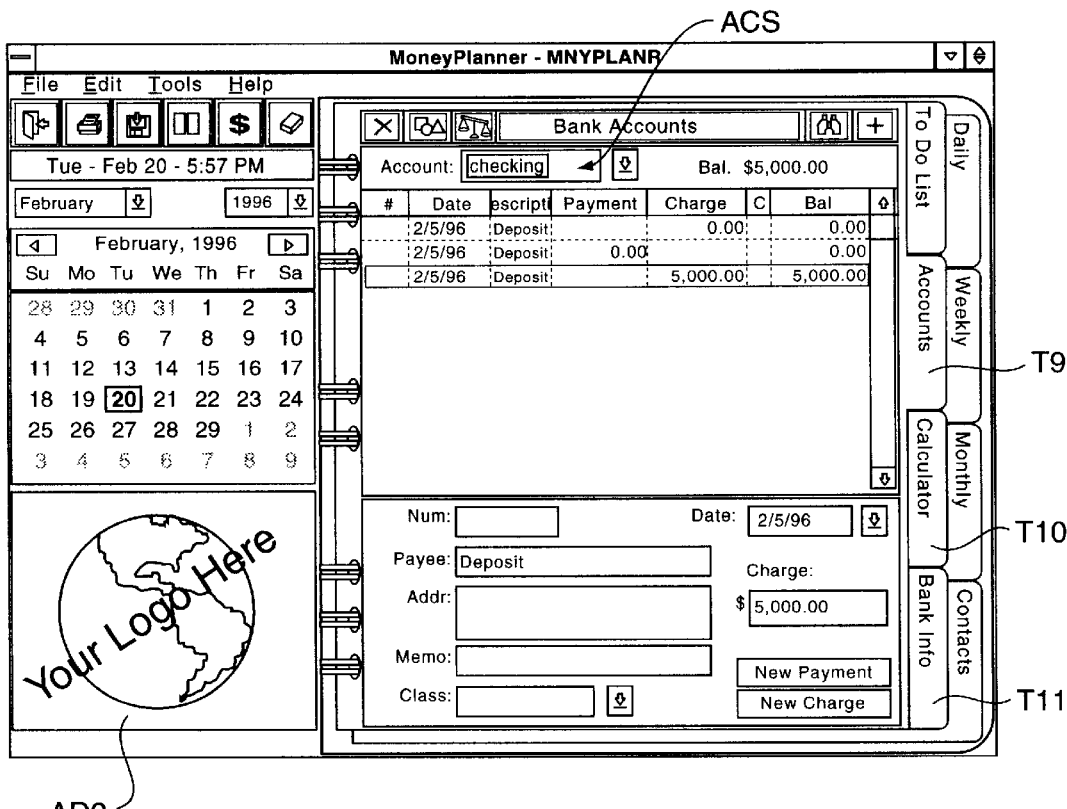
Figure 24:
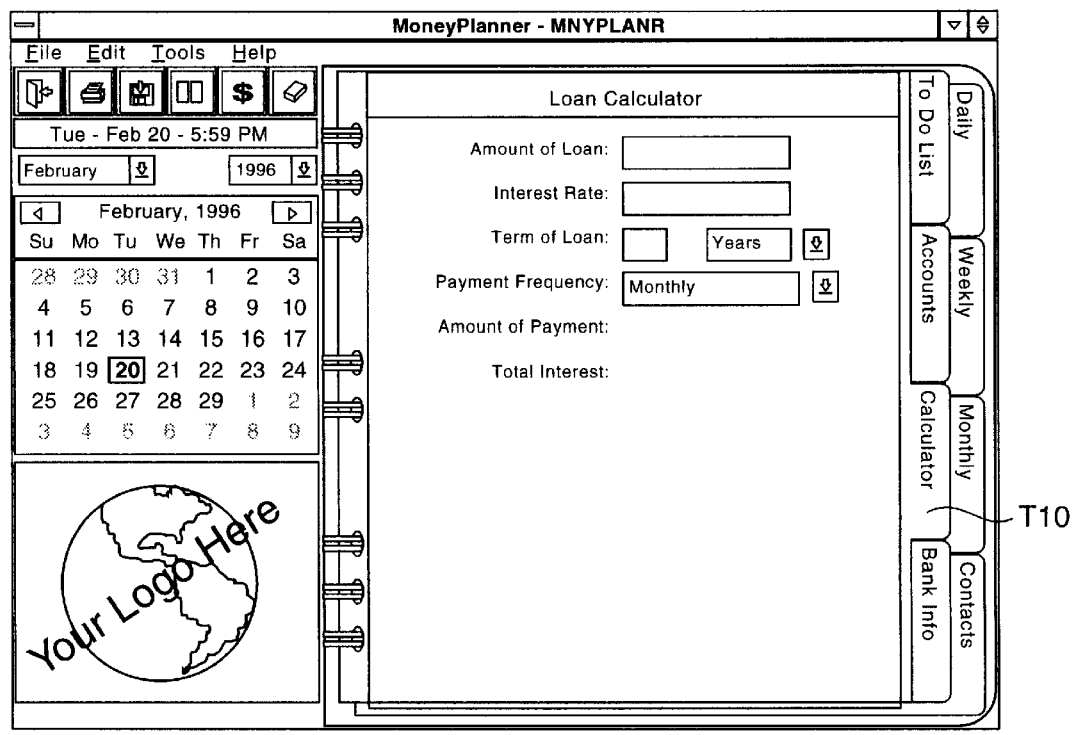
Figure 25:
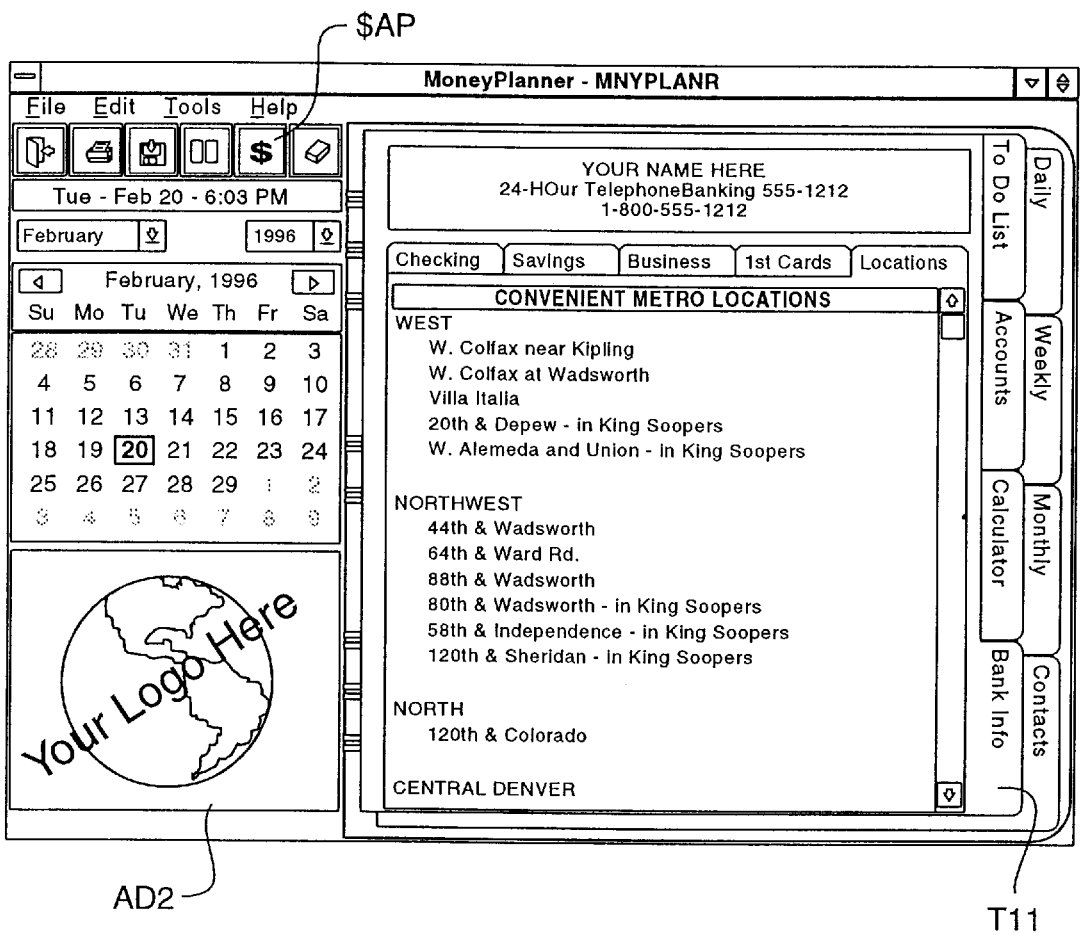

In addition, many of the financial functions can be incorporated into the personal activity scheduling system PA. FIGS. 23–25 illustrate various displays which are used to enable the user to access these functions. In particular, as shown in FIG. 23, there are a plurality of additional tabs: Accounts (T9), Calculator (T10), and Bank Info (T11). These tabs can be used in addition to the tabs T1–T8 described above or can be used to replace some of these tabs. It is obvious that various hierarchies and organizations of tabs are possible and simply represent matters of design choice for one skilled in the art of user interface design.

The Accounts tab T9 presents a display of the user's bank account(s), with a listing of transactions. The user can select from a number of accounts via the display field ACS with its associated arrow selection icon. For the purpose of illustration, the user's checking account is displayed in this figure and the various entries made by the user are shown listed in this display. In addition, fields are provided at the lower portion of the screen to enable the user to write checks and note deposits and other charges to the bank account. The user can use the keyboard K of the user terminal device PC to input data to the various fields displayed in FIG. 23 to record a hand-written check or to enable the personal activity scheduling system PA to print a check via the printer as is well-known in checkbook software systems.

The Calculator tab T10 enables the user to access a loan calculator program (one of the time-based modules TB*), thereby providing the user with the ability to determine various loan terms and conditions. This capability is especially useful when the user is shopping for a new loan. The Bank Info tab T11, when selected by the user, results in the display of FIG. 25 being presented to the user. This display provides address information for all the branches of the user's bank when the Locations subsection tab is selected. Additional subsection tabs are provided for Checking, Savings, Business, 1st Cards (credit cards) to enable the user to access information regarding these specific accounts. This account information can include user account number, bank telephone numbers, account representative names, a description of the various accounts that are available, even loan applications. For example, the loan application form can be accessed by the user activating the $, icon ($AP) on the display of FIG. 25. The loan application is a bank-specific form (not shown), which the user can complete via keyboard K. The completed loan application can then be printed via the printer or electronically transmitted to the bank via the modem M. In addition, the data filed AD2 can present advertisements which vary as a function of the account or function that is selected by the user. The user can have their business and personal accounts at different banks, and the advertisement that appears in field AD2 would reflect the identity of the bank whose account information is being accessed in the remainder of the screen. In addition, for the loan application function, the field AD2 can be used to provide instructions to the user to enable the completion of the loan application in a simple manner.

Trivia

Figure 22:
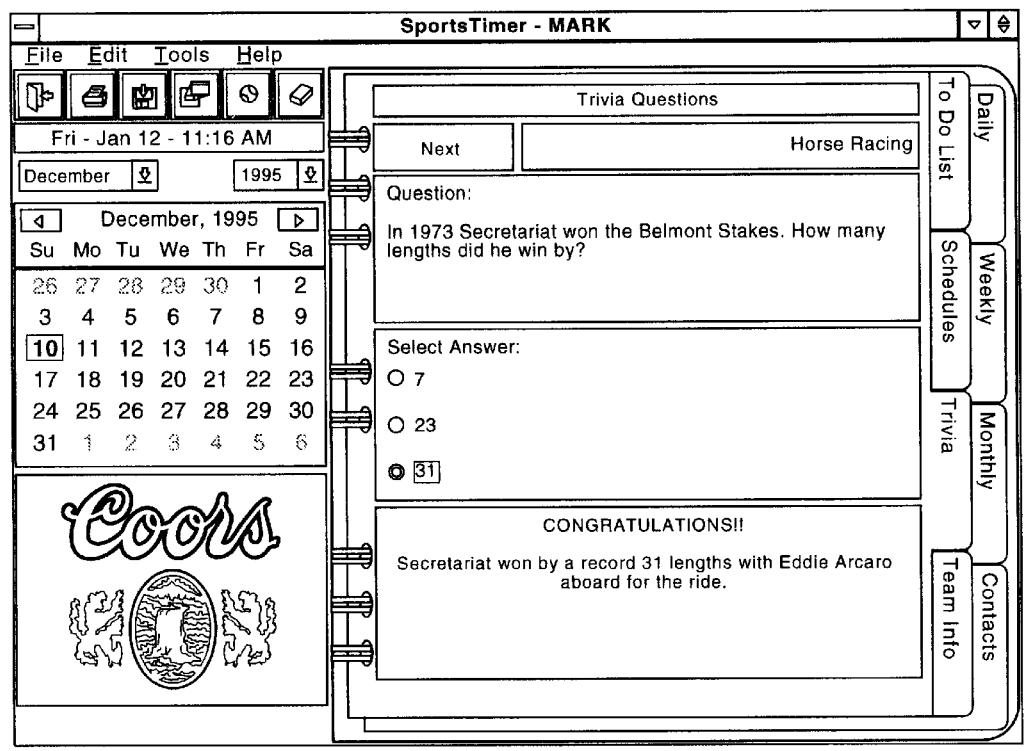

FIG. 22 illustrates the display produced when the user activates the "Trivia" tab, T7. This screen presents a trivia game in field TRW for the user to play, and can be combined with the coupon capability described above to reward a user who scores above a particular level in this contest. In addition, the display field TRW can be used to provide the user with any information that the user wishes to receive. Therefore, if the user prefers to interconnect the personal activity scheduling system PA with a third-party processor, the user can receive messages, such as the present weather report, in this display field TRW.

Advertising

As noted above, the display screens can be presented with a field AD which contains some commercial advertisement. The commercial advertising typically comprises some message which is unrelated to the underlying program, or may relate to some adjunct activity. The commercial can be time-based and/or situational-based in that the message and/or advertiser varies as a function of time and/or the program function. Thus, the advertisement can relate to a particular event, which related event data is queried by the user as shown in FIGS. 19 and 20 as described above. The advertisement can vary with time, so that the integration module IM excerpts time-based data, corresponding to the present time as identified by the real time clock C of the terminal device PC, from the corresponding application module TB2 corresponding to advertisements. The excerpted data is then input to the calendar system CA for display to the user via display D. The data exception step can be performed on a present time basis, or future time-based advertisements can be preloaded into the calendar system CA, as a function of the processing needs of the terminal device PC. Examples of the varying nature of the advertisements that can typically be displayed in field AD are shown in the Figures.

Other Applications

While the primary focus of the above description has been related to time-based data, as noted above, the system is not limited to such data. The system can be used for other applications, such as travel related scheduling and planning. Therefore, the displays can provide a listing of airline flights and ticket information, hotel prices, and rental car rates. The system can be used as described above, to order tickets and place reservations. In addition, the display of a facility layout can be extrapolated to include a map of the hotel environs, noting various eating and entertainment establishments that may be of interest to the user. Thus, the personal activity scheduling system PA should not be construed as solely limited to calendar scheduling, but instead should be viewed as inclusive of all user activity related functions, so that the personal activity scheduling system PA enables the user to execute many personal and business planning functions via the single system.

Summary

The personal activity scheduling system utilizes a basic appointment book type of calendar as the fabric into which is woven a plurality of "application modules". The application modules produce data indicative of activities and events that are of interest to the user. The generated data can be time based, situation based, geographic based, or any type of third party data. An integration module merges the data into the calendar on an automatic basis to enable the user to use the calendar system for a multitude of purposes. This integration of functions also includes the activation of features which enable the user to make use of the application data to order tickets, pay bills, and other unique capabilities absent from existing calendar systems.

We claim:

1. A calendar system executing on a processor, which has a real-time clock, for temporally coordinating application data, comprising:

means, responsive to said real-time clock, for maintaining a time scheduling calendar;

at least one application which produces application data, comprising at least one of:

1.) trivia means comprising:

means for storing data indicative of date based trivia, means, responsive to data output by said real-time clock indicative of a present date, for retrieving data from said means for storing corresponding to at least one of said date based trivia, means for displaying said date based trivia;

2.) trivia quiz program means, comprising:

means for enabling a user to be tested on trivia knowledge, means, responsive to a user scoring greater than a predetermined score in said trivia quiz program, for printing a predetermined coupon for redemption at a predetermined commercial establishment;

3.) means for displaying advertising, including at least one of:

coupon means, comprising:
    means for storing data indicative of predetermined coupons,
    means, responsive to data output by said real-time clock indicative of a present date, for retrieving data from said means for storing corresponding to at least one of said predetermined coupons,
    means for transmitting said retrieved data to a printer for printing said predetermined coupon;
    means for loading said advertising into said calendar system from an external interface;
means for integrating said application data into said time scheduling calendar; and
means for displaying said time scheduling calendar, containing said application data, to a user.

2. The calendar system of claim 1 wherein said at least one application comprises:
    means for maintaining a schedule for a plurality of events from at least one of the classes of events comprising: sports schedules, entertainment events, cultural events, personal events, financial events, travel events.

3. The calendar system of claim 2 wherein said integrating means comprises:
    means for storing data indicative of said schedule for said plurality of events; and
    means for associating said data indicative of said schedule for said plurality of events with temporal entries in said time scheduling calendar for display by said means for displaying.

4. The calendar system of claim 2 wherein said integrating means comprises:
    means for storing data indicative of said schedule for said plurality of events;
    means, responsive to a user selecting at least one of said events for excerpting schedule data, associated with said selected events, from said stored data; and
    means for associating said excerpted schedule data with temporal entries in said time scheduling calendar for display by said means for displaying.

5. The calendar system of claim 2 wherein said at least one application further comprises:
    means for storing a display of physical facilities of a location at which said plurality of events is to be held;
    means, responsive to a user selecting a one of said plurality of events, for retrieving data from said storing means indicative of a display of physical facilities of a location at which said selected event is to be held; and
    means for transmitting said retrieved data to said means for displaying to present a display to said user of said physical facilities.

6. The calendar system of claim 2 wherein said at least one application further comprises:
    means for storing data indicative of a schedule for said plurality of events;
    means, responsive to a user selecting a one of said plurality of events, for retrieving data from said storing means indicative of a list of presentations of said selected event; and
    means for transmitting said retrieved data to said means for displaying to present a display to said user of said list.

7. The calendar system of claim 2 wherein said at least one application further comprises:
    means for storing data indicative of ticket information for said plurality of events;
    means, responsive to a user selecting a one of said plurality of events, for retrieving data from said storing means indicative of ticket information for said selected event; and
    means for transmitting said retrieved data to said means for displaying to present a display to said user of said ticket information.

8. The calendar system of claim 7 wherein said at least one application further comprises:
    means, responsive to user activation, for establishing a communication connection from said processor to a remotely located system for ticket ordering.

9. The calendar system of claim 8 wherein said at least one application further comprises:
    means, responsive to data received from said remotely located system for ticket ordering, for printing tickets to said selected event.

10. The calendar system of claim 2 wherein said at least one application further comprises:
    means, responsive to a user selecting a one of said plurality of events, for establishing a communication connection from said processor to a remotely located ticket ordering system;
    means, responsive to data received from said retrieving data from said remotely located ticket ordering system indicative of ticket information for said selected event for displaying said ticket information;
    means, responsive to user activation, for transmitting data to said remotely located ticket ordering system indicative of ticket ordering information.

11. The calendar system of claim 10 wherein said at least one application further comprises:
    means, responsive to data received from said remotely located ticket ordering system, for printing tickets to said selected event.

12. The calendar system of claim 1 wherein said means for displaying produces a visual display of said time scheduling calendar on a one of the bases of: daily, weekly, monthly and said means for displaying produces an icon indicative of said time-based data, which icon is inserted into a temporally appropriate position on said visual display of said time scheduling calendar.

13. The calendar system of claim 1 further comprising:
    means for determining temporal correspondence of a time indication associated with said application data and a time indication output from said real time clock; and
    means, responsive to said determining means, for transmitting data to said means for displaying to produce a reminder of at least one of audible and visual in nature indicative of said temporal correspondence.

14. The calendar system of claim 1 further comprising:
    means for editing said application data integrated into said calendar system.

15. The calendar system of claim 1 further comprising:
    means for searching said application data which has been integrated into said calendar system to locate a selected entry.

16. The calendar system of claim 1 further comprising:
    means for maintaining data indicative of address book information; and
    means for transmitting a selected set of said maintained data to said means for displaying to present a display to said user of an address book entry corresponding to said selected set of maintained data.

17. The calendar system of claim 1 further comprising:

means for maintaining data indicative of a list of actions to be taken by said user; and means for transmitting a selected set of said maintained data to said means for displaying to present a display to said user of an action entry corresponding to said selected set of maintained data.

18. The calendar system of claim 17 further comprising:

means for maintaining data indicative of progress made to complete each of said actions; and means for transmitting a selected set of said maintained progress data to said means for displaying to present a display to said user of progress made on an action entry corresponding to said selected set of maintained progress data.

19. The calendar system of claim 17 further comprising:

means for maintaining data indicative of a preferred order of said actions; and means for transmitting a selected set of said maintained order data to said means for displaying to present a display to said user of a preferred order of said action entries.

20. The calendar system of claim 1 further comprising:

means for maintaining data indicative of personal events;

means, responsive to data output by said real-time clock indicative of a present date, for retrieving data from said means for maintaining corresponding to at least one of said personal events; and means for transmitting said retrieved data to said means for displaying to display said personal event data.

21. The calendar system of claim 1 further comprising:

means for loading a one of said at least one application which produces application data and said application data into said calendar system from an external interface comprising a one of: disk drive device and modem.

22. The calendar system of claim 1 wherein said processor comprises a one of a personal processor system and an Internet server.

23. A method for temporally coordinating application data, produced by at least one application, with a calendar system executing on a processor, which has a real-time clock, comprising the steps of:

maintaining, in response to said real-time clock, a time scheduling calendar;

executing at least one application which produces application data, comprising at least one of:

1.) trivia application, comprising:
  storing, data in a memory indicative of date based trivia,
  retrieving, in response to data output by said real-time clock indicative of a present date, for retrieving data from said memory corresponding to at least one of said date based trivia,
  displaying to display said date based trivia;

2.) testing a user on trivia knowledge using a trivia quiz program,
  printing, in response to a user scoring greater than a predetermined score in said trivia quiz program, a predetermined coupon for redemption at a predetermined commercial establishment;

3.) displaying advertising, including at least one of:
  generating coupons, comprising:
    storing data in said memory indicative of predetermined coupons,
    retrieving, in response to data output by said real-time clock indicative of a present date, data from said memory corresponding to at least one of said predetermined coupons,
    printing said predetermined coupon;
  loading said advertising into said calendar system from an external interface;

integrating said application data into said time scheduling calendar; and displaying said time scheduling calendar, containing said application data, to a user on a display device.

24. The method of claim 23 wherein said at least one application comprises a system for maintaining a schedule for a plurality of events from at least one of the classes of events comprising: sports schedules, entertainment events, cultural events, personal events, financial events, travel events, said step of integrating comprises:

storing data indicative of said schedule for said plurality of events in a memory; and associating said data indicative of said schedule for said plurality of events with temporal entries in said time scheduling calendar for display on said display device.

25. The method of claim 23 wherein said at least one application comprises a system for maintaining a schedule for a plurality of events from at least one of the classes of events comprising: sports schedules, entertainment events, cultural events, personal events, financial events, travel events, further comprising the steps of:

storing data indicative of said schedule for said plurality of events in a memory;

excerpting, in response to a user selecting at least one of said events, schedule data, associated with said selected events, from said stored data; and associating said excerpted schedule data with temporal entries in said time scheduling calendar for display by said display device.

26. The method of claim 23 wherein said at least one application comprises a system for maintaining a schedule for a plurality of events from at least one of the classes of events comprising: sports schedules, entertainment events, cultural events, personal events, financial events, travel events, further comprising the steps of:

storing a display of physical facilities of a location at which said plurality of events is to be held in a memory;

retrieving, in response to a user selecting a one of said plurality of events, data from said memory indicative of a display of physical facilities of a location at which said selected event is to be held; and transmitting said retrieved data to said display device to present a display to said user of said physical facilities.

27. The method of claim 23 wherein said at least one application comprises a system for maintaining a schedule for a plurality of events from at least one of the classes of events comprising: sports schedules, entertainment events, cultural events, personal events, financial events, travel events, further comprising the steps of:

storing data indicative of a schedule for said plurality of events;

retrieving, in response to a user selecting a one of said plurality of events, data from said storing means indicative of a list of presentations of said selected event; and transmitting said retrieved data to said display device to present a display to said user of said list.

28. The method of claim 23 wherein said at least one application comprises a system for maintaining a schedule for a plurality of events from at least one of the classes of events comprising: sports schedules, entertainment events, cultural events, personal events, financial events, travel events, further comprising the steps of:

storing data indicative of ticket information for said plurality of events in a memory;

retrieving, in response to a user selecting a one of said plurality of events, data from said memory indicative of ticket information for said selected event; and transmitting said retrieved data to said display device to present a display to said user of said ticket information.

29. The method of claim 28 further comprising the step of:

establishing, in response to user activation, a communication connection from said processor to a remotely located system for ticket ordering.

30. The method of claim 29 further comprising the step of:

printing, in response to data received from said remotely located system for ticket ordering, tickets to said selected event.

31. The method of claim 23 wherein said at least one application comprises a system for maintaining a schedule for a plurality of events from at least one of the classes of events comprising: sports schedules, entertainment events, cultural events, personal events, financial events, travel events, further comprising the steps of:

establishing, in response to a user selecting a one of said plurality of events, a communication connection from said processor to a remotely located ticket ordering system;

displaying, in response to data received from said retrieving data from said remotely located ticket ordering system indicative of ticket information for said selected event, said ticket information;

transmitting, in response to user activation, data to said remotely located ticket ordering system indicative of ticket ordering information.

32. The method of claim 31 further comprising the step of:

printing, in response to data received from said remotely located ticket ordering system, tickets to said selected event.

33. The method of claim 22 further comprising the steps of:

storing data indicative of date based trivia in a memory;

retrieving, in response to data output by said real-time clock indicative of a present date, for retrieving data from said memory corresponding to at least one of said date based trivia; and transmitting said retrieved data to said display device to display said date based trivia.

34. The method of claim 23 wherein said display device produces a visual display of said time scheduling calendar on a one of the bases of: daily, weekly, monthly and said display device produces an icon indicative of said time-based data, which icon is inserted into a temporally appropriate position on said visual display of said time scheduling calendar.

35. The method of claim 23 further comprising the steps of:

determining temporal correspondence of a time indication associated with said application data and a time indication output from said real time clock; and transmitting said application data to said display device to produce a reminder of at least one of audible and visual in nature indicative of said temporal correspondence.

36. The method of claim 23 further comprising the steps of:

maintaining data indicative of a list of actions to be taken by said user; and transmitting a selected set of said maintained data to said display device to present a display to said user of an action entry corresponding to said selected set of maintained data.

37. The method of claim 36 further comprising the steps of:

maintaining data indicative of progress made to complete each of said actions; and transmitting a selected set of said maintained progress data to said display device to present a display to said user of progress made on an action entry corresponding to said selected set of maintained progress data.

38. The method of claim 36 further comprising the steps of:

maintaining data indicative of a preferred order of said actions; and transmitting a selected set of said maintained order data to said display device to present a display to said user of a preferred order of said action entries.

39. The method of claim 23 further comprising the steps of:

maintaining data indicative of personal events in a memory;

retrieving, in response to data output by said real-time clock indicative of a present date, data from said memory corresponding to at least one of said personal events; and transmitting said retrieved data to said display device to display said personal event data.

40. The method of claim 23 further comprising the step of:

loading a one of said at least one application which produces application data and said application data into said calendar system from an external interface comprising a one of: disk drive device and modem.

* * * * *